United States Patent
Taki et al.

(10) Patent No.: US 9,191,137 B2
(45) Date of Patent: Nov. 17, 2015

(54) TRANSMISSION APPARATUS, RECEPTION APPARATUS, TRANSMISSION METHOD, AND RECEPTION METHOD

(71) Applicant: FUJITSU LIMITED, Kawasaki-shi, Kanagawa (JP)

(72) Inventors: Yoshitaka Taki, Kawasaki (JP); Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 13/627,663

(22) Filed: Sep. 26, 2012

(65) Prior Publication Data

US 2013/0028613 A1  Jan. 31, 2013

Related U.S. Application Data

(63) Continuation of application No. PCT/JP2010/055680, filed on Mar. 30, 2010.

(51) Int. Cl.
*H04L 12/66* (2006.01)
*H04J 3/16* (2006.01)

(52) U.S. Cl.
CPC ......... *H04J 3/1652* (2013.01); *H04J 2203/006* (2013.01); *H04J 2203/0071* (2013.01)

(58) Field of Classification Search
None
See application file for complete search history.

(56) References Cited

U.S. PATENT DOCUMENTS

| | | | |
|---|---|---|---|
| 2002/0176356 A1* | 11/2002 | Courtney et al. | 370/216 |
| 2003/0161262 A1* | 8/2003 | Hosoi | 370/228 |
| 2004/0208529 A1* | 10/2004 | Noxon et al. | 398/33 |
| 2007/0036447 A1* | 2/2007 | Dei et al. | 382/240 |
| 2007/0076769 A1* | 4/2007 | Zou | 370/539 |
| 2010/0067547 A1 | 3/2010 | Katagiri et al. | |
| 2010/0080245 A1* | 4/2010 | Kisaka et al. | 370/470 |
| 2010/0135652 A1* | 6/2010 | Jiang et al. | 398/10 |
| 2010/0158519 A1* | 6/2010 | Dong et al. | 398/45 |
| 2010/0226652 A1* | 9/2010 | Vissers et al. | 398/98 |
| 2010/0232786 A1* | 9/2010 | Aoki et al. | 398/19 |
| 2011/0008041 A1* | 1/2011 | Uchiyama et al. | 398/30 |
| 2011/0150468 A1* | 6/2011 | Uchida et al. | 398/45 |
| 2011/0236031 A1* | 9/2011 | Itou | 398/141 |
| 2012/0148236 A1* | 6/2012 | Kumar et al. | 398/34 |
| 2012/0230674 A1* | 9/2012 | Yuan et al. | 398/17 |

FOREIGN PATENT DOCUMENTS

| | | |
|---|---|---|
| JP | 2004-266480 | 9/2004 |
| JP | 2005-223933 | 8/2005 |
| JP | 2010-62682 | 3/2010 |
| WO | WO 2004/088889 | 10/2004 |
| WO | 2008/087975 A1 | 7/2008 |

(Continued)

OTHER PUBLICATIONS

Partial translation of JP 2005-223933 (Ref. AL in the IDS filed Sep. 26, 2012).
Partial translation of WO 2009/090777 (Ref. AJ in the IDS filed Sep. 26, 2012).

(Continued)

*Primary Examiner* — Phirin Sam
(74) *Attorney, Agent, or Firm* — Staas & Halsey LLP

(57) ABSTRACT

A transmission apparatus includes a generation unit configured to generate a first data unit including a second data unit, and an addition unit configured to add fault data indicating a fault state of the second data unit to a data portion different from a data portion in which the second data unit is positioned within the first data unit.

16 Claims, 21 Drawing Sheets

(56) References Cited

FOREIGN PATENT DOCUMENTS

| | | |
|---|---|---|
| WO | WO 2009/090742 | 7/2009 |
| WO | WO 2009/090777 | 7/2009 |

OTHER PUBLICATIONS

Office Action mailed May 7, 2013 in corresponding Japanese Patent Application No. 2012-507948.

\* cited by examiner

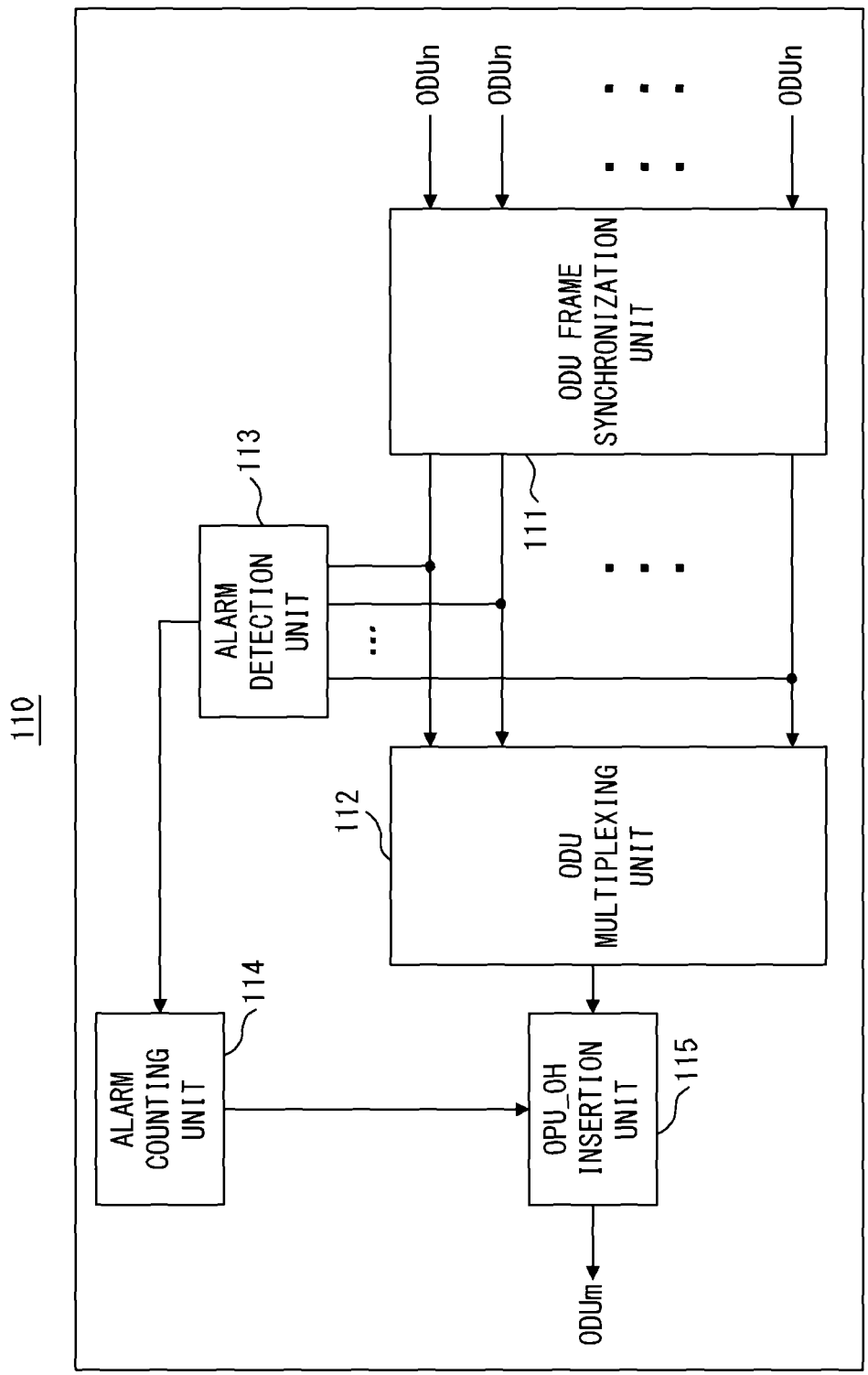
F I G. 1

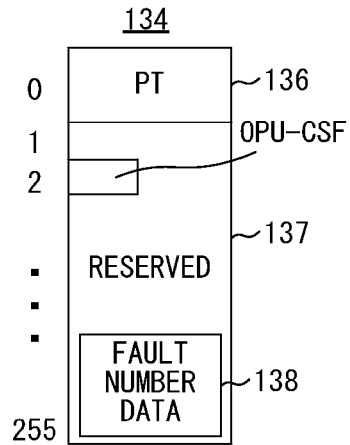
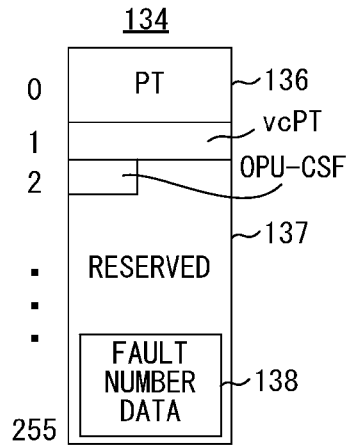
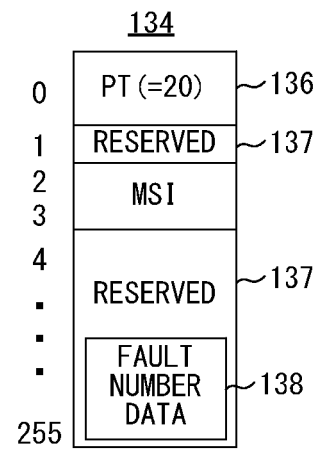
FIG. 3A    FIG. 3B    FIG. 3C
FIG. 3D    FIG. 3E    FIG. 3F
FIG. 3G    FIG. 3H

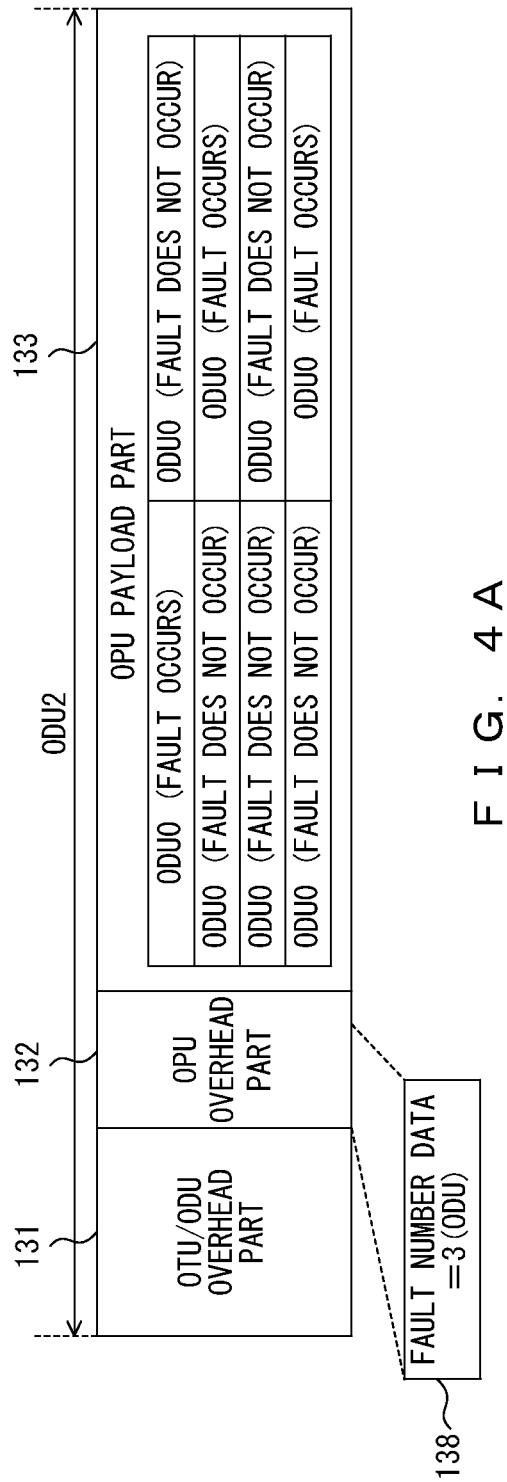
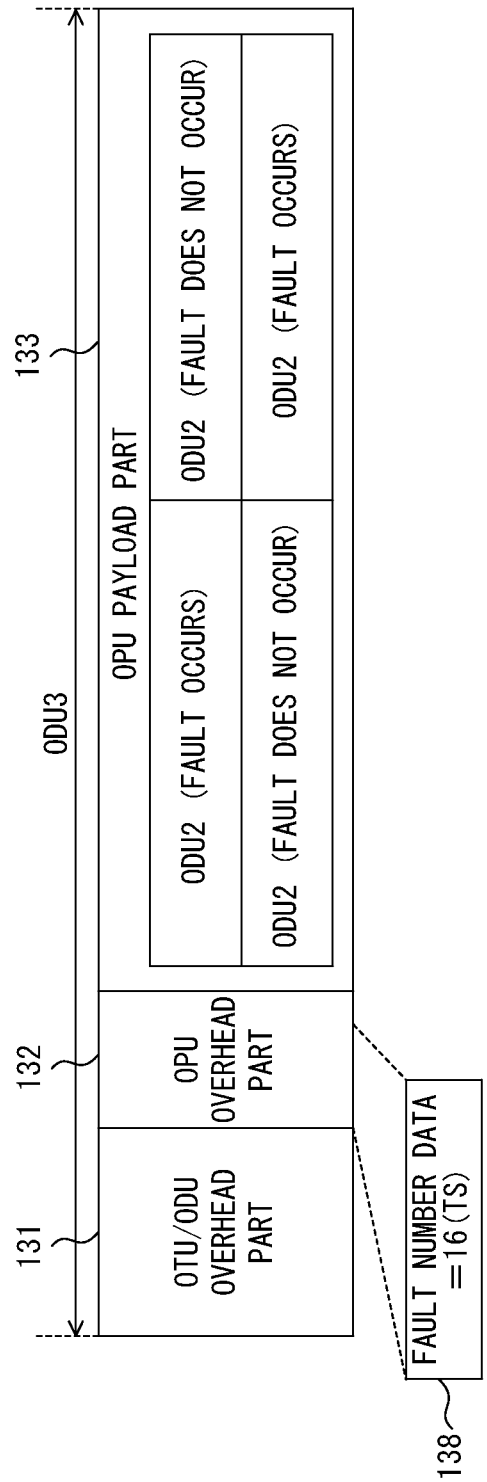
FIG. 4A
FIG. 4B

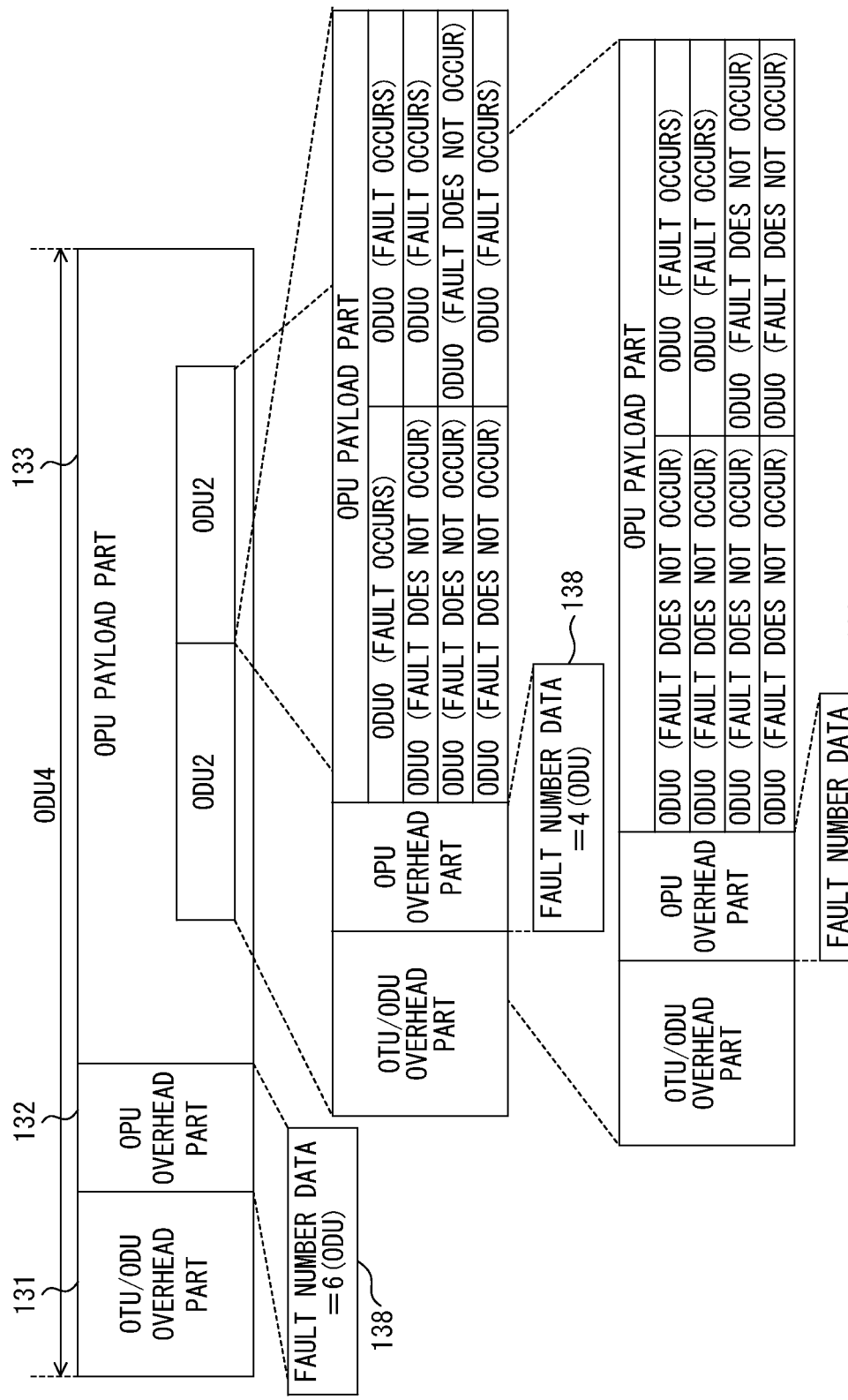
F I G. 12

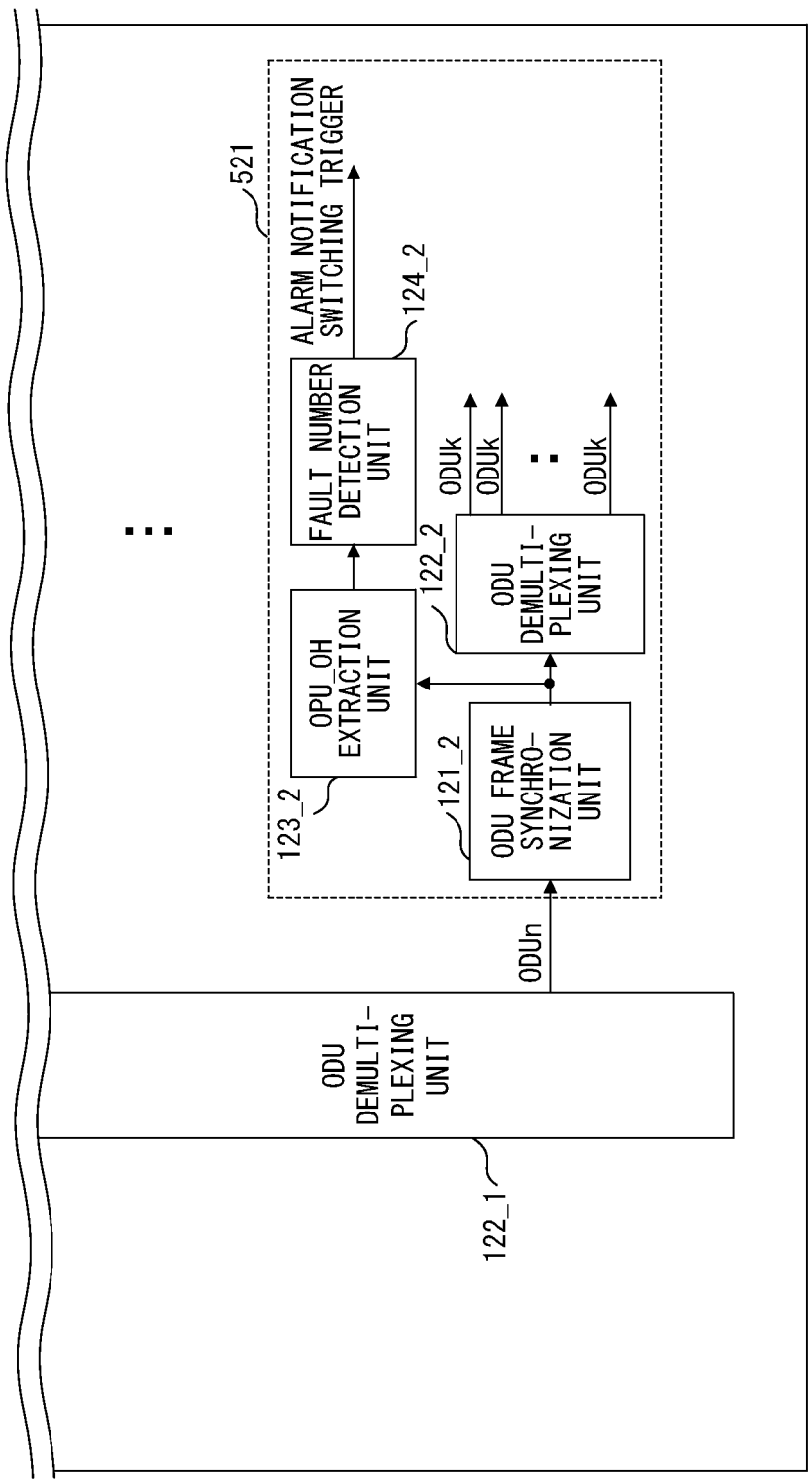
F I G. 1 3 B

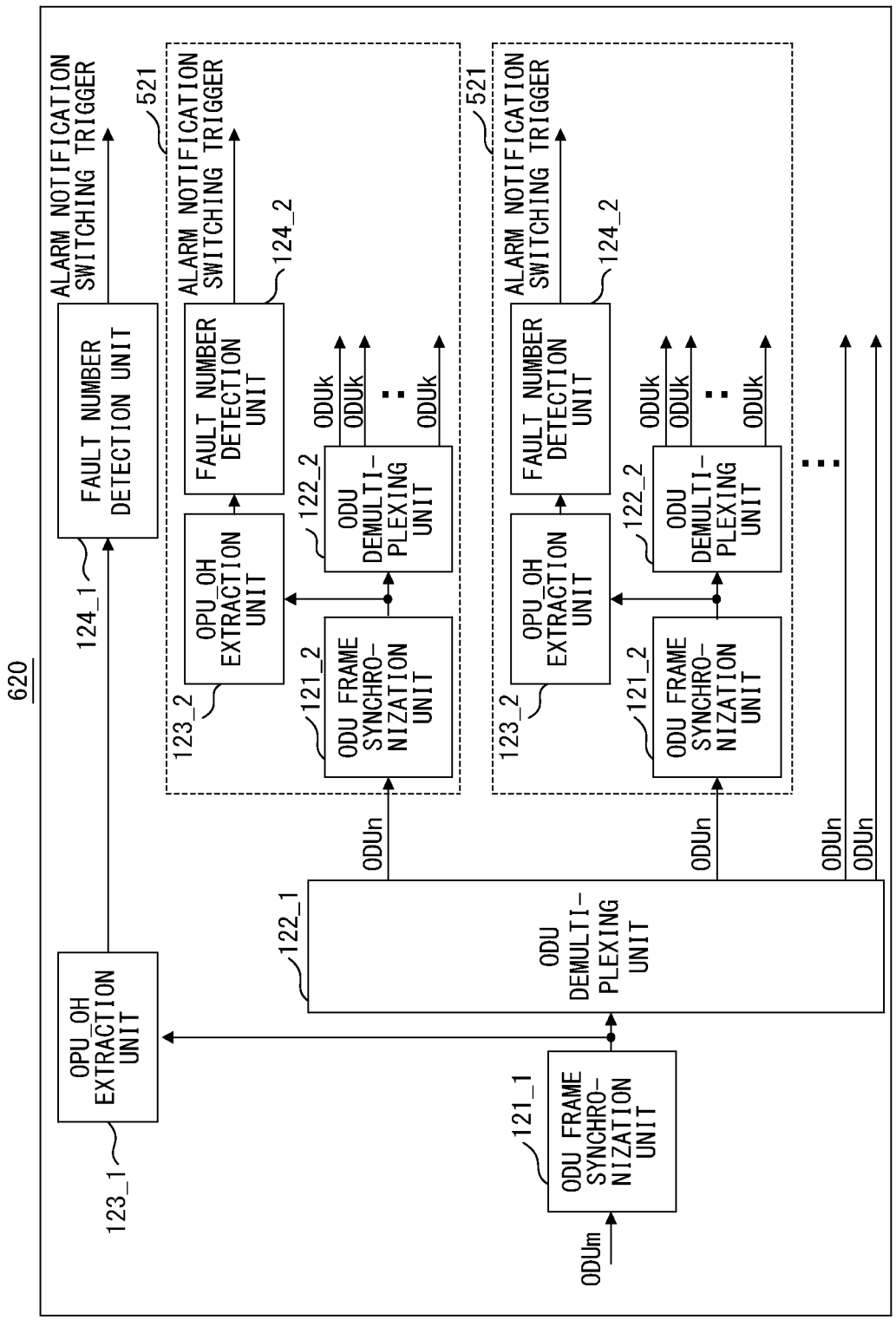
F I G. 16

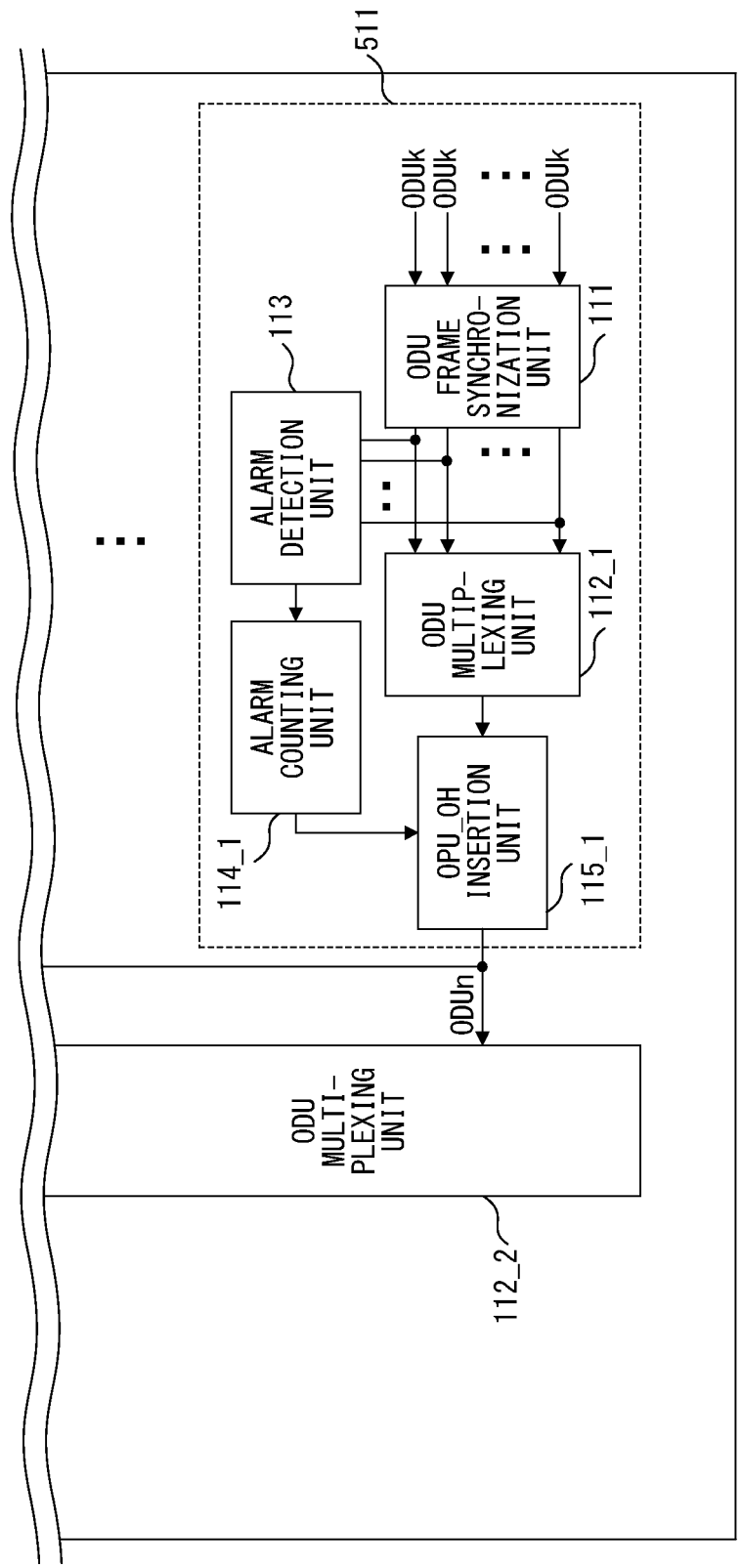
F I G. 17B

TRANSMISSION APPARATUS, RECEPTION APPARATUS, TRANSMISSION METHOD, AND RECEPTION METHOD

CROSS-REFERENCE TO RELATED APPLICATION

This application is a continuation application of International PCT Application No. PCT/JP2010/055680, filed on Mar. 30, 2010 and designated for the U.S., the entire contents of which are incorporated herein by reference.

FIELD

The present invention relates to a transmission apparatus, a reception apparatus, a transmission method, and a reception method that transmit or receive such as data, and more particularly to a transmission apparatus, a reception apparatus, a transmission method, and a reception method that transmit or receive such as data on a backbone line as a trunk transmission path.

BACKGROUND

As a communication standard employed for a trunk transmission path such as a backbone line, and other transmission paths, Optical Transport Network (OTN) recommended by International Telecommunication Union Telecommunication Standardization Sector (ITU-T) is proposed. OTN defines an Optical channel Data Unit (ODU) as one of data units (or data frames), which is a unit for transmitting/receiving data.

ITU-T permits multiplexing of ODUs. For example, it is permitted to use a high-order ODU whitch includes low-order ODUs of a plurality of channels in a payload part (such as an Optical channel Payload Unit (OPU) payload part). More specifically, it is permitted to use an ODU2 which includes ODU0s of a plurality of channels in a payload part. It is also permitted to multiplex high-order ODUs of a plurality of channels, into each of which low-order ODUs are multiplexed, into a higher-order ODU. More specifically, it is permitted to further multiplex, for example, ODU2s of a plurality of channels, into each of which ODU0s of a plurality of channels are multiplexed, into an ODU4 (namely, the ODU2s are included in a payload part of the ODU4).

According to the currently proposed OTN, a communication apparatus such as a transmission apparatus, a reception apparatus or the like can not recognize a fault (in other words, an error) that occurs in low-order ODUs unless it performs synchronization at a level of the low-order ODUs when the low-order ODUs are multiplexed into a high-order ODU. Namely, the communication apparatus can only recognize a fault that occurs in low-order ODUs if it demultiplexes the low-order ODUs of a plurality of channels multiplexed into a high-order ODU and synchronizes the demultiplexed low-order ODUs. Accordingly, when ODUs are multiplexed, a plurality of synchronization circuits need to be provided within a communication apparatus according to the number of multiplexed ODUs. This causes a technical problem such that a circuit scale or a processing load of a communication apparatus increases.

The same can be said also in a case where an Ethernet (registered trademark) frame in 10 Giga bit Ethernet (GbE) or GbE, a Synchronous Transport Module (STM) frame in Synchronous Digital Hierarchy (SDH), a Synchronous Transport Signal (STS) frame or an Optical Carrier (OC) signal in Synchronous Optical Network (SONET) is mapped in a payload unit of an ODU. Specifically, when such a mapping process is executed, a communication apparatus can not recognize a fault that occurs in a frame unless it demaps a frame mapped in the ODU and synchronizes the demapped frame. Accordingly, it is needed to execute the demapping process and the synchronization process only for recognition of a fault that occurs in a frame under certain circumstances. This causes a technical problem such that a circuit scale or a processing load of a communication apparatus increases.

PRIOR ART DOCUMENTS

Patent Documents

Patent Document 1: Japanese Laid-Open Patent Publication No. 2004-266480

SUMMARY

According to an aspect of the embodiments, a transmission apparatus includes a generation unit configured to generate a first data unit including a second data unit, and an addition unit configured to add fault data indicating a fault state of the second data unit to a data portion different from a data portion in which the second data unit is positioned within the first data unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating one example of a configuration of a transmission apparatus according to a first embodiment;

FIGS. 3A-3H are a schematic illustrating a data structure of a PSI included in an ODU:

FIGS. 4A and 4B are a schematic illustrating a specific example of a data structure of an ODU to which fault number data is added;

FIG. 12 is a schematic illustrating a specific example of a data structure of an ODU to which fault number data is added;

FIGS. 13A and 13B are a block diagram illustrating one example of a configuration of a reception apparatus according to the fifth embodiment;

FIG. 16 is a block diagram illustrating one example of a configuration of a reception apparatus according to the sixth embodiment; and FIGS. 17A and 17B are a block diagram illustrating one example of a configuration of a transmission apparatus according to a seventh embodiment.

DESCRIPTION OF EMBODIMENTS

Figure 2:
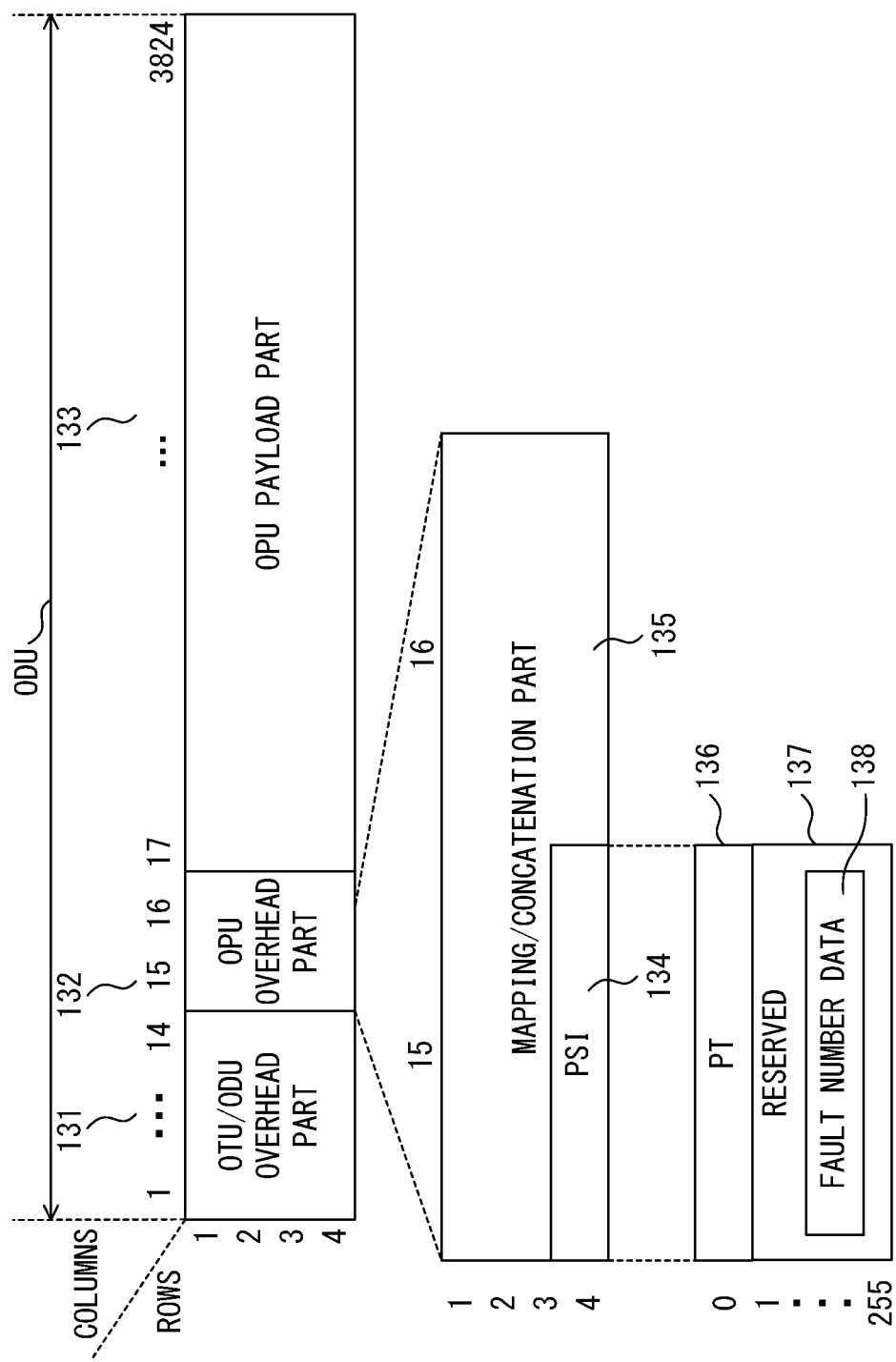
FIG. 2 is a schematic illustrating a data structure of an ODU.

Best modes for carrying out the invention are described below with reference to the drawings. The following description is provided by taking, as an example, communication apparatuses (specifically, a transmission apparatus and a reception apparatus) conforming to Optical Transport Network (OTN) recommended by International Telecommunication Union Telecommunication Standardization Sector (ITU-T).

(1) First Embodiment

A first embodiment is described with reference to FIGS. 1 to 5.

(1-1) Transmission Apparatus

A transmission apparatus 110 according the first embodiment is described with reference to FIG. 1. Here, FIG. 1 is a block diagram illustrating one example of a configuration of the transmission apparatus 110 according to the first embodiment.

As illustrated in FIG. 1, the transmission apparatus 110 according to the first embodiment includes an Optical channel Data Unit (ODU) frame synchronization unit 111, an ODU multiplexing unit 112 corresponding to one specific example of "a generation unit", an alarm detection unit 113, an alarm counting unit 114, and an optical channel Payload Unit Overhead (OPU_OH) insertion unit 115 corresponding to one specific example of "an addition unit".

To the ODU frame synchronization unit 111, low-order ODUns (n is an integer equal to or larger than 0) of x (x is an integer equal to or larger than 1) channels are input. The low-order ODUns correspond to one specific example of "a second data unit". The ODU frame synchronization unit 111 outputs the low-order ODUns of x channels to the ODU multiplexing unit 112 and the alarm detection unit 113 after synchronizing the low-order ODUs of x channels.

The ODU multiplexing unit 112 multiplexes the low-order ODUns of x channels. Specifically, the ODU multiplexing unit 112 multiplexes the low-order ODUns of x channels into an OPU payload part 133 (see FIG. 2) of a high-order ODUm (m is an integer that satisfies m>n). The high-order ODUm corresponds to one specific example of "a first data unit". The ODU multiplexing unit 112 outputs, to the OPU_OH insertion unit 115, the high-order ODUm having the OPU payload part 133 into which the low-order ODUns of x channels are multiplexed.

In the meantime, the alarm detection unit 113 detects whether or not a fault has occurred in each of the low-order ODUns of x channels . The alarm detection unit 113 outputs, to the alarm counting unit 114, an alarm indicating that a fault has been detected each time it detects a low-order ODUn where a fault occurs (in other words, a low-order ODUn that cannot be properly transmitted or read). The alarm detection unit 113 may detect a fault in units of ODUns. Namely, the alarm detection unit 113 may output, to the alarm counting unit 114, an alarm indicating that a fault has been detected each time it detects an ODUn where a fault occurs.

The alarm counting unit 114 counts the number of alarms output from the alarm detection unit 113. The alarm counting unit 114 outputs the number of counted alarms to the OPU_OH insertion unit 115 in synchronization with a cycle where ODUns are multiplexed (in other words, a cycle where a high-order ODUm is generated). At this time, the alarm counting unit 114 may output the number of counted alarms to the OPU_OH insertion unit 115 without change. In this case, the number of alarms output from the alarm counting unit 114 is the same as the number of ODUns where a fault occurs. Alternatively, the alarm counting unit 114 may output, to the OPU_OH insertion unit 115, a number obtained by multiplying the number of counted alarms by the number of tributary slots configuring an ODUn.

In this case, the number of alarms output from the alarm counting unit 114 is the same as the number of tributary slots configuring an ODUn where a fault occurs. The tributary slots correspond to one specific example of "a divided unit".

The OPU_OH insertion unit 115 inserts various items of information in an OPU overhead part 132 (see FIG. 2) of a high-order ODUm output from the ODU multiplexing unit 112. In the first embodiment, the OPU_OH insertion unit 115 inserts fault number data 138 (see FIG. 2) indicating the number of alarms output from the alarm counting unit 114 in a specified data portion of the OPU overhead part 132 of the high-order ODUm. Namely, the OPU_OH insertion unit 115 inserts, in the specified data portion of the OPU overhead part 132 of the high-order ODUm, the fault number data 138 indicating the number of ODUns where a fault occurs among the low-order ODUns of the X channels multiplexed into the high-order ODUm (or the number of tributary slots configuring an ODUn where a fault occurs).

Thereafter, various items of information are inserted in an Optical channel Transport Unit (OTU)/ODU overhead part 131 (see FIG. 2) of the high-order ODUm when needed. Then, the ODUm is transmitted, for example, to the reception apparatus 120 (See FIG. 5) as opposed to the transmission apparatus 110.

Implementations of inserting the fault number data 138 are described with reference to a data structure of an ODU (namely, an ODUn or an ODUm) illustrated in FIGS. 2 and 3. Here, FIG. 2 is a schematic illustrating a data structure of an ODU, whereas FIG. 3 is a schematic illustrating a data structure of a PSI 134 included in the ODU.

As illustrated in FIG. 2, the ODU includes an OTU/ODU overhead part 131, an OPU overhead part 132, and an OPU payload part 133. The ODU illustrated in FIG. 1 is configured by aggregating data groups each having a size of 8 bits×256 bits by 3824 columns×4 rows.

The OTU/ODU overhead part 131 occupies a data portion corresponding to 1st to 14th columns (a size in one column in a column direction is 8 bits), and 1st to 4th rows (a size of one row in a row direction is 256 bits) within the ODU. The OTU/ODU overhead part 131 includes various items of information for controlling and managing the ODU. The OTU/ODU overhead part 131 includes, for example, Path Monitoring (PM), Tandem Connection Monitoring (TCM), FFault Type & Fault Location reporting channel (TFL), Experimental (EXP), General Communication Channel (GCC), Automatic Protection Switching coordination channel (APS), Protection Communication Control channel (PCC), and a reserved (RES) area.

The OPU overhead part 132 occupies a data portion corresponding to the 15th and the 16th columns and the 1st to the 4th rows within the ODU. The OPU overhead part 132 includes various items of information for controlling and managing the OPU payload part 133. Specifically, the OPU overhead part 132 includes a Payload Structure identifier (PSI) occupying a data portion of the 15th column and the 4th row, and a mapping/concatenation portion (Mapping& Concat. Specific) 135 occupying the other data portions.

The PSI 134 includes a Payload Type (PT) 136 occupying the 0th byte, and a RES area 137 occupying the other data portions (namely, the 1st to the 255th bytes). In the first embodiment, the above described fault number data 138 is included in a specified data portion or an arbitrary data portion within the RES area 137 included in the PSI 134.

The data structure of the PSI 134 varies depending on a type of an ODU including the PSI 134. Specifically, when the PSI 134 is that for CBR mapping of an LO OPU, the PSI 134 includes a PT 136 occupying the 0th byte, an OPU-CSF occupying the first bit of the second byte, and a RES area 137 occupying the other data portions (the first to the 255th bytes except for the first bit of the second byte) as illustrated in FIG. 3A. Similarly, when the PSI 134 is that for a virtual concatenation of an LO OPU, the PSI 134 includes a PT 136 occupying the 0th byte, a virtual concatenated Payload Type (vcPT) occupying the first byte, an OPU-CSF occupying the first bit of the second byte, and a RES area 137 occupying the other data portions (the second to the 255th bytes except for the first bit of the second byte) as illustrated in FIG. 3B. Similarly, when the PSI 134 is that for an HO OPU1 having PT=20, the PSI 134 includes a PT 136 occupying the 0th byte, an Multiplex Structure Identifier (MSI) occupying the second to the third bytes, and a RES area 137 occupying the other data portions (the first byte, and the fourth to the 255th bytes) as illustrated in FIG. 3C. Similarly, when the PSI 134 is that for an HO OPU2 having PT=20, the PSI 134 includes a PT 136 occupying the 0th byte, an MSI occupying the second to the fifth bytes, and a RES area 137 occupying the other data portions (the first byte, and the sixth to the 255th bytes) as illustrated in FIG. 3D. Similarly, when the PSI 134 is that for an HO OPU2 having PT=21, the PSI 134 includes a PT 136 occupying the 0th byte, an MSI occupying the second to the ninth bytes, and a RES area 137 occupying the other data portions (the first byte, and the tenth to the 255th bytes) as illustrated in FIG. 3E. Similarly, when the PSI 134 is that for an HO OPU3 having PT=20, the PSI 134 includes a PT 136 occupying the 0th byte, an MSI occupying the second to the 17th bytes, and a RES area 137 occupying the other data portions (the first byte, and the 18th to the 255th bytes) as illustrated in FIG. 3F. Similarly, when the PSI 134 is that for an HO OPU3 having PT=21, the PSI 134 includes a PT 136 occupying the 0th byte, an MSI occupying the second to the 33rd bytes, and a RES area 137 occupying the other data portions (the first byte, and the 34th to the 255th bytes) as illustrated in FIG. 3G. Similarly, when the PSI 134 is that for an HO OPU4 having PT=21, the PSI 134 includes a PT 136 occupying the 0th byte, an MSI occupying the second to the 81st bytes, and a RES area 137 occupying the other data portions (the first byte, and the 82nd to the 255th bytes) as illustrated in FIG. 3H.

Also in all the above described examples illustrated in FIGS. 3A to 3H, it is preferable to insert the fault number data 138 in a specified data portion or an arbitrary data portion of the RES area 137 within the PSI 134.

A specific example of the fault number data 138 is described next with reference to FIG. 4. Here, FIG. 4 is a schematic illustrating a specific example of a data structure of an ODU to which the fault number data 138 is added.

An example where ODU0s (namely, low-order ODUns) of x=8 channels are multiplexed into an ODU2 (namely, a high-order ODUm) as illustrated in FIG. 4A is described. In this case, the ODU multiplexing unit 112 multiplexes ODU0s of 8 channels output from the ODU frame synchronization unit 111 into an OPU payload part 133 of the ODU2. Here, assume that a fault occurs in the ODU0s of 3 channels among the ODU0s of 8 channels to be multiplexed. In this case, the alarm detection unit 113 outputs an alarm to the alarm counting unit 114 each time it detects each of the ODU0s of 3 channels where a fault occurs. Accordingly, the number of alarms counted by the alarm counting unit 114 results in "3". Therefore, the fault number data 138 inserted in the RES area 137 within the PSI 134 included in the OPU overhead part 132 of the ODU2 includes information "3 (ODU)" in the example illustrated in FIG. 4A.

In the meantime, the fault number data 138 may indicate the number of faults in units of tributary slots configuring an ODUn as described above. An example of such fault number data 138 indicating the number of faults in units of tributary slots is described with reference to FIG. 4B. The example where ODU2s (namely, low-order ODUs) of 4 channels are multiplexed into an ODU3 (namely, a high-order ODU) as illustrated in FIG. 4B is described. In this case, the ODU multiplexing unit 112 multiplexes the ODU2s of 4 channels output from the ODU frame synchronization unit 111 into an OPU payload part 133 of the ODU 3. Here, assume that a fault occurs in the ODU2s of 2 channels among the ODU2s of 4 channels to be multiplexed. In this case, the alarm detection unit 113 outputs an alarm to the alarm counting unit 114 each time it detects each of the ODU2s where a fault occurs. Accordingly, the number of alarms counted by the alarm counting unit 114 results in "2". Here, in conformity with GIN recommended by ITU-T, the number of tributary slots configuring the ODU2 is "8". Therefore, the fault number data 138 inserted in the RES area 137 within the PSI 134 included in the OPU overhead part 132 of the ODU 2 includes information "2×8=16 (TS)".

(1-2) Reception Apparatus

The reception apparatus 120 according to the first embodiment is described next with reference to FIG. 5. Here, FIG. 5 is a block diagram illustrating one example of a configuration of the reception apparatus 120 according to the first embodiment.

Figure 5:
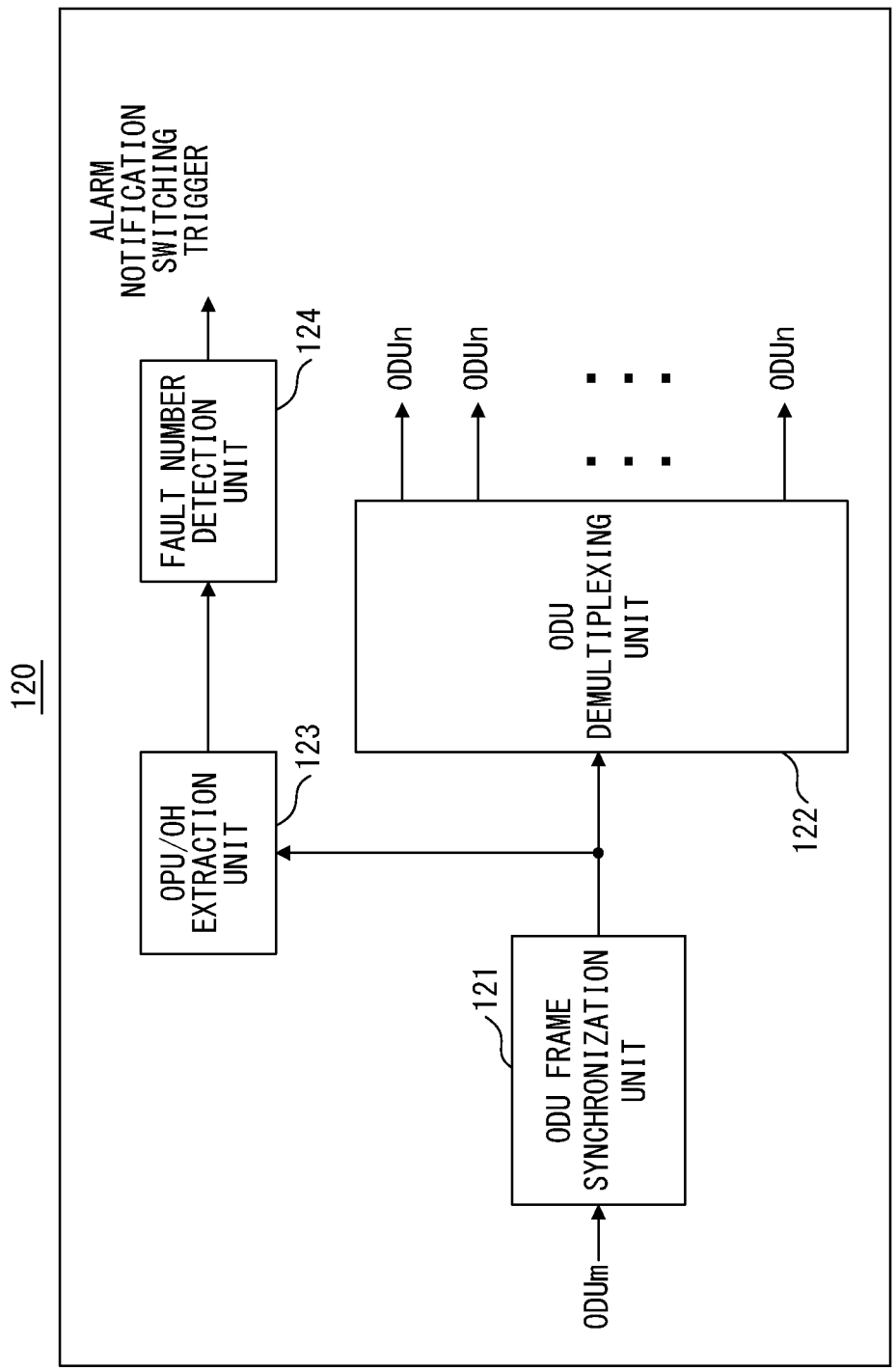
FIG. 5 is a block diagram illustrating one example of a configuration of a reception apparatus according to the first embodiment.

As illustrated in FIG. 5, the reception apparatus 120 according to the first embodiment includes an ODU frame synchronization unit 121 corresponding to one specific example of "an obtainment unit", an ODU demultiplexing unit 122, an OPU_OH extraction unit 123 corresponding to one specific example of "an extraction unit", and a fault number detection unit 124 corresponding to one specific example of "an extraction unit".

To the ODU frame synchronization unit 121, a high-order ODUm transmitted, for example, from the transmission apparatus 110 as opposed to the reception apparatus 120 is input. The ODU frame synchronization unit 121 outptus the high-order ODUm to the ODU demultiplexing unit 122 and the OPU_OH extraction unit 123 after synchronizing the high-order ODUm.

The ODU demultiplexing unit 122 demultiplexes low-order ODUns of x channels from the high-order ODUm. In other words, the ODU demultiplexing unit 122 demultiplexes the low-order ODUns of x channels multiplexed into the OPU payload part 133 of the high-order ODUm as individual ODUns. The ODU demultiplexing unit 122 may output the demultiplexed low-order ODUns of x channels to a processing unit for executing various types of processes for each of the ODUns when needed.

In the meantime, the OPU_OH extraction unit 123 extracts the OPU overhead part 132 of the high-order ODUm. Thereafter, the OPU_OH extraction unit 123 outputs the extracted OPU overhead part 132 to the fault number detection unit 124.

The fault number detection unit 124 extracts the fault number data 138 from the OPU overhead part 132 extracted by the OPU_OH extraction unit 123. As a result, the fault number detection unit 124 can recognize the number of ODUns or tributary slots where a fault occurs by regarding, as targets, the low-order ODUns of x channels multiplexed into the high-order ODUm input to the ODU frame synchronization unit 121. As a result, the fault number detection unit 124 outputs an alarm notification switching trigger for controlling a selection operation or a switching operation of a transmission path based on the recognized fault state. For example, the fault number detection unit 124 outputs, based on the recognized fault state, an alarm notification switching trigger for causing a selection operation or a switching operation to be performed so that a suitable or a high-quality transmission path is used.

As described above, according to the first embodiment, the transmission apparatus 110 can insert the fault number data 138 in the OPU overhead part 132 which is different from the OPU payload part 133 into which low-order ODUns are multiplexed within a high-order ODUm. Accordingly, the reception apparatus 120 that receives the high-order ODUm can obtain the fault number data 138 from the high-order ODUm without synchronizing low-order ODUns included in the high-order ODUm. In other words, the reception apparatus 120 can obtain the fault number data 138 without synchronizing the multiplexed low-order ODUns, by synchronizing the high-order ODUm. Therefore, the reception apparatus 120 can recognize the fault state of the multiplexed low-order ODUns without synchronizing the low-order ODUns included in the high-order ODUm. Accordingly, the reception apparatus 120 may not include a plurality of synchronization circuits for respectively synchronizing low-order ODUns of a plurality of channels, which are conventionally needed to recognize a fault state of multiplexed low-order ODUns. Therefore, the transmission apparatus 110 according to the first embodiment can cause the reception apparatus 120 to preferably recognize a fault state of low-order ODUns included in a high-order ODUm while relatively reducing a circuit scale or a processing load of the reception apparatus 120.

Additionally, the reception apparatus 120 according to the first embodiment can extract fault number data 138 from a high-order ODUm. Namely, the reception apparatus 120 can obtain the fault number data 138 without synchronizing multiplexed low-order ODUn, by synchronizing a high-order ODUm. Accordingly, as described above, the reception apparatus 120 can preferably recognize a fault state of low-order ODUns included in a high-order ODUm while relatively reducing its circuit scale or processing load.

In addition, according to the first embodiment, the transmission apparatus 110 can insert the fault number data 138 indicating the number of faults in units of low-order ODUns in a high-order ODUm. Accordingly, the reception apparatus 120 can preferably recognize a fault state of the low-order ODUns.

Alternatively, according to the first embodiment, the transmission apparatus 110 can insert, in a high-order ODUm, the fault number data 138 indicating the number of faults in units of tributary slots into which a low-order ODUn is further divided. Therefore, the reception apparatus 120 can more preferably recognize a fault state of low-order ODUns. This is described by taking a first example where ODU1s of 4 channels including ODU1s of 2 channels where a fault occurs are multiplexed into an ODU2, and a second example where ODU2s of 4 channels including ODUs of 2 channels where a fault occurs into an ODU3. When the fault number data 138 indicates the number of faults in units of low-order ODUns, the fault number data 138 indicates "2" in both the first and the second examples. Alternatively, when the fault number data 138 indicates the number of faults in units of tributary slots configuring a low-order ODUn, the fault number data 138 indicates "2×2=4" in the first example and "2×8=16" in the second example. Accordingly, the reception apparatus 120 can recognize that the degree of a fault in the second example is higher than that in the first example.

The above description refers to the examples of the case where the transmission apparatus 110 and the reception apparatus 120 are respectively configured to be independent apparatuses. However, one communication apparatus may be configured to include both the transmission apparatus 110 and the reception apparatus 120. By being configured in this way, the communication apparatus can produce the above described various types of effects.

Furthermore, the above description refers to the examples where the fault number data 138 is inserted in the RES area 137 within the PSI 134 included in the OPU overhead part 132. However, the above described data portion in which the fault number data 138 is inserted is merely one example. The fault number data 138 may be inserted in a data portion other than the RES area 137 within the PSI 134. However, from the viewpoint of obtaining the fault number data 138 from a high-order ODUm without synchronizing low-order ODUns included in the high-order ODUm, it is preferable to insert the fault number data 138 in a data portion other than the OPU payload part 133 of the high-order ODUm. Alternatively, from a similar viewpoint, the fault number data 138 may be inserted in a data portion other than a data portion into which low-order ODUns are multiplexed within the OPU payload part 133 of a high-order ODUm.

Furthermore, the above description refers to the example where the number of ODUns where a fault occurs, or the number of tributary slots configuring an ODUn where a fault occurs is used as the fault number data 138 indicating a fault state of low-order ODUns. However, arbitrary information indicating a fault state of low-order ODUns (such as information indicating the degree of a fault, information indicating a portion where a fault occurs, information indicating a possibility that a fault is corrected) may be used as the fault number data 138.

(2) Second Embodiment

Figure 6:
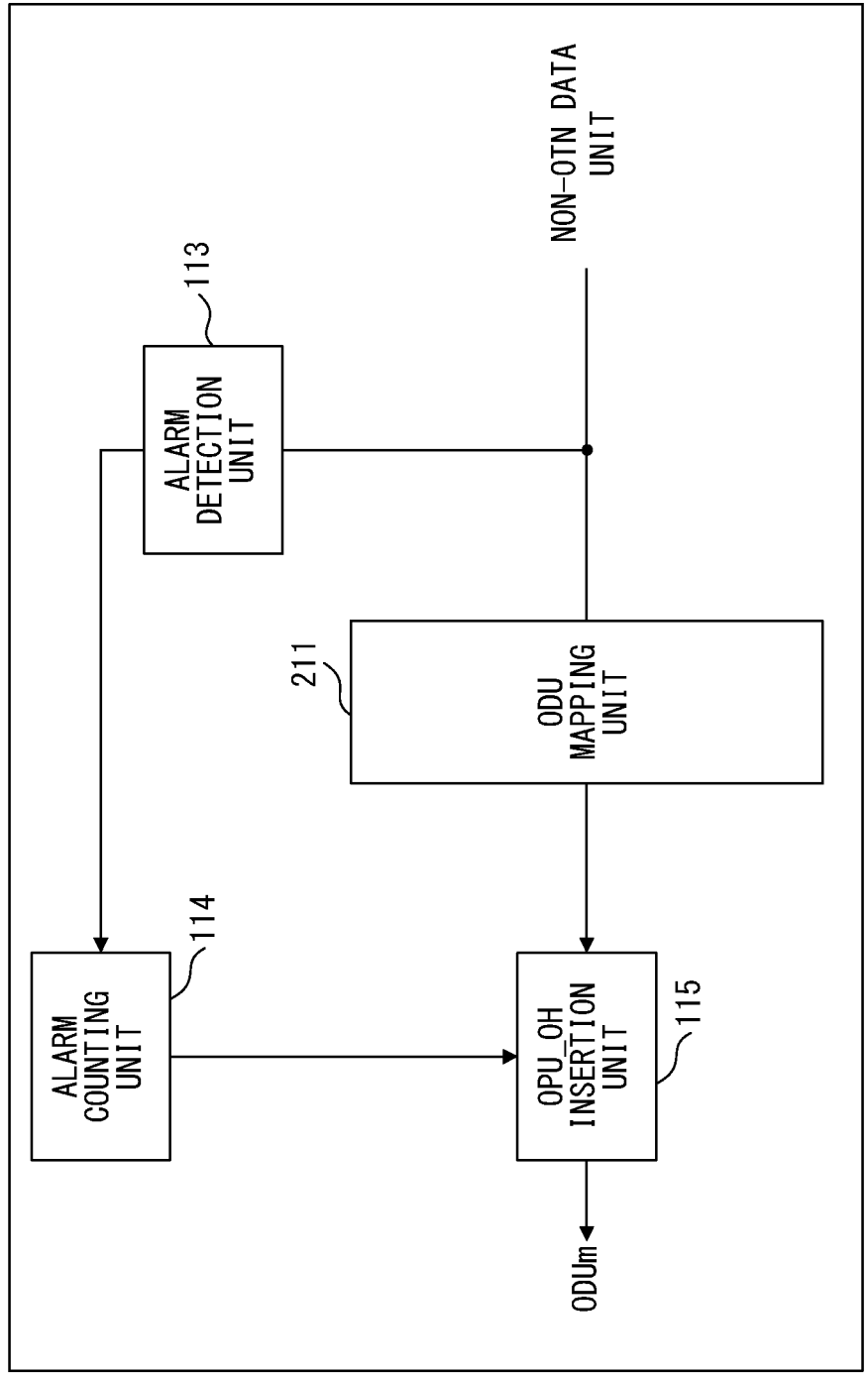
FIG. 6 is a block diagram illustrating one example of a configuration of a transmission apparatus according to a second embodiment.
Figure 7:
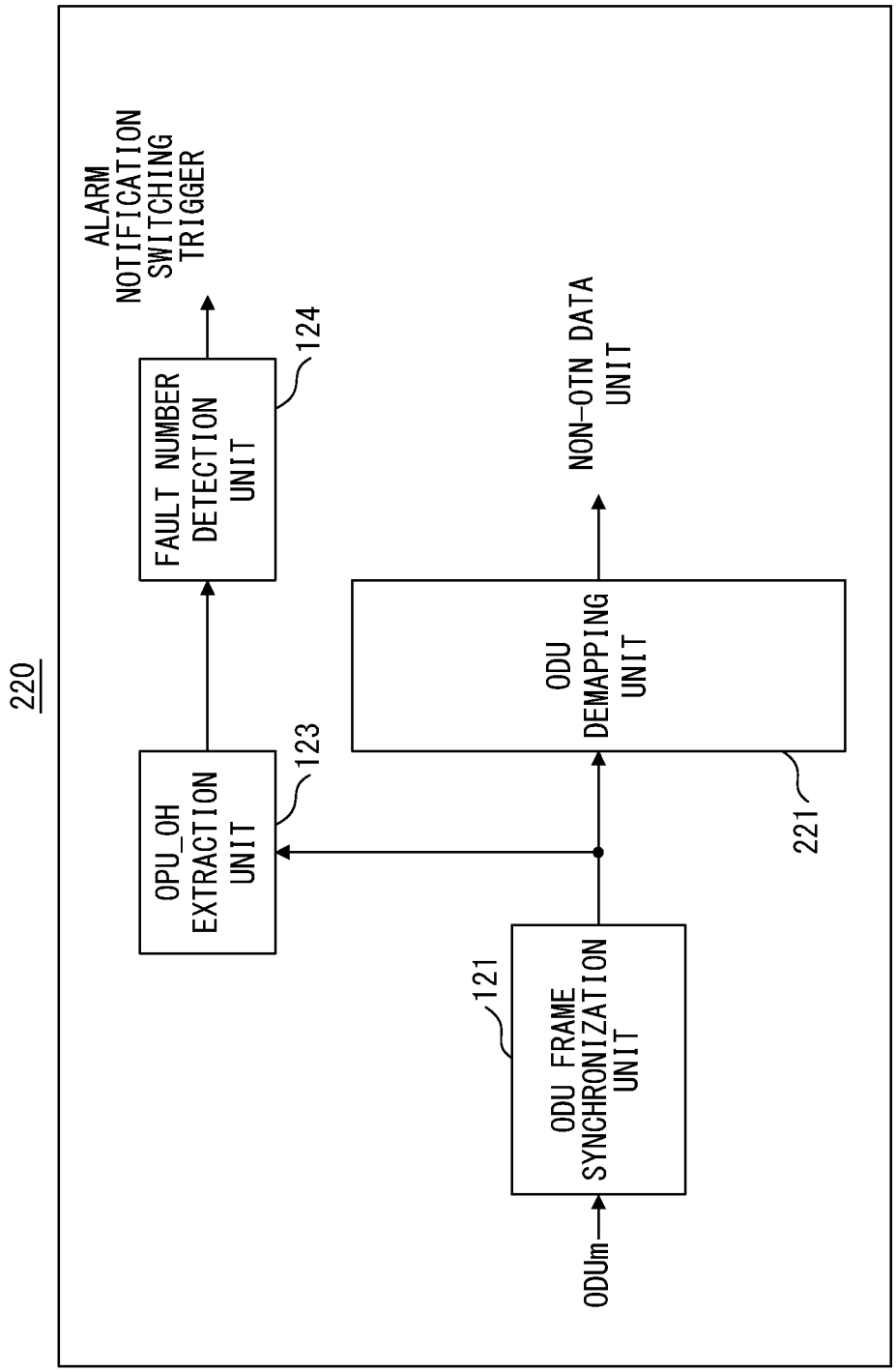
FIG. 7 is a block diagram illustrating one example of a configuration of a reception apparatus according to the second embodiment.

A transmission apparatus 210 and a reception apparatus 220 according to a second embodiment are described next with reference to FIGS. 6 and 7. Here, FIG. 6 is a block diagram illustrating one example of a configuration of the transmission apparatus 210 according to the second embodiment, whereas FIG. 7 is a block diagram illustrating one example of a configuration of the reception apparatus 220 according to the second embodiment. The same components as those included in the transmission apparatus 110 and the reception apparatus 120 according to the above described first embodiment are denoted with the same reference numerals, and their detailed descriptions are omitted.

As illustrated in FIG. 6, the transmission apparatus 210 according to the second embodiment includes an ODU mapping unit 211 corresponding to one specific example of "a generation unit", the alarm detection unit 113, the alarm counting unit 114, and the OPU_OH insertion unit 115.

To the ODU mapping unit 211, a data unit (hereinafter referred to as "a non-OTN data unit") other than a data unit conforming to OTN (namely, an ODU) is input. As one example of the non-OTN data unit, for example, an Ethernet (registered trademark) frame in 10 Giga bit Ethernet (GbE) or GbE, a Synchronous Transport Module (STM) frame in Synchronous Digital Hierarchy (SDH), a Synchronous Transport Signal (STS) frame or an Optical Carrier (OC) signal in Synchronous Optical Network (SONET), or the like can be cited. The non-OTN data unit corresponds to one specific example of "a second data unit". The ODU mapping unit 211 maps the non-OTN data unit in the OPU payload part 133 of an ODUm which is a data unit conforming to OTN. The ODU mapping unit 211 outputs the ODUm in which the non-OTN data unit is mapped to the OPU_OH insertion unit 115.

In the meantime, the alarm detection unit 113 detects whether or not a fault occurs in the non-OTN data unit. In the second embodiment, the alarm detection unit 113 output an alarm indicating that a fault has been detected to the alarm counting unit 114 when the fault has occurred in the non-OTN data unit. Alternatively, if the fault has not occurred in the non-OTN data unit, the alarm detection unit 113 does not output an alarm indicating that a fault has been detected to the alarm counting unit 114.

The alarm counting unit 114 counts the number of alarms output from the alarm detection unit 113. The alarm counting unit 114 outputs the number of counted alarms to the OPU_OH insertion unit 115 in synchronization with a cycle where a non-OTN data unit is mapped (in other words, a cycle where an ODUm is generated).

The OPU_OH insertion unit 115 inserts the fault number data 138 indicating the number of alarms output from the alarm counting unit 114 in a specified data portion (such as the above described RES area 137 within the PSI 134) of the OPU overhead part 132 of the ODUm. Namely, the OPU_OH insertion unit 115 inserts the fault number data 138 indicating whether or not a fault occurs in a non-OTN data unit mapped in the ODUm in the specified data portion of the OPU overhead part 132 of the ODUm. In the second embodiment, when a fault occurs in a non-OTN data unit, the fault number data 138 indicates "1". Alternatively, when a fault does not occur in the non-OTN data unit, the fault number data 138 indicates "0".

As illustrated in FIG. 7, the reception apparatus 220 according to the second embodiment includes the ODU frame synchronization unit 121 corresponding to one specific example of "an obtainment unit", an ODU demapping unit 221, an OPU_OH extraction unit 123 corresponding to one specific example of "an extraction unit", and a fault number detection unit 124 corresponding to one specific example of "an extraction unit".

To the ODU frame synchronization unit 121, an ODUm transmitted, for example, from the transmission apparatus 210 as opposed to the reception apparatus 220 is input. The ODU frame synchronization unit 121 outputs the ODUm to the ODU demapping unit 221 and the OPU_OH extraction unit 123 after synchronizing the ODUm.

The ODU demapping unit 221 extracts a non-OTN data unit from the ODUm. The ODU demapping unit 221 may output the extracted non-OTN data unit to a processing unit executing various types of processes for the non-OTN data unit when needed.

The OPU_OH extraction unit 123 and the fault number detection unit 124 perform operations similar to those of the first embodiment. Namely, the OPU_OH extraction unit 123 extracts an OPU overhead part 132 of the ODUm, and the fault number detection unit 124 extracts fault number data 138 from the OPU overhead part 132 extracted by the OPU_OH extraction unit 123.

As described above, according to the second embodiment, even if a non-OTN data unit other than a data unit conforming to OTN is mapped in an ODUm which is a data unit conforming to OTN, effects similar to the various types of effects produced by the transmission apparatus 110 or the reception apparatus 120 according to the above described first embodiment can be benefited. Namely, the reception apparatus 220 can obtain the fault number data 138 from an ODUm without synchronizing a non-OTN data unit included in the ODUm.

Accordingly, the reception apparatus may not include a synchronization circuit for synchronizing a non-OTN data unit which is conventionally needed to recognize a fault state of the mapped non-OTN data unit. Therefore, according to the second embodiment, the reception apparatus 220 can be caused to preferably recognize a fault state of a non-OTN data unit mapped in an ODUm while relatively reducing a circuit scale or a processing load of the reception apparatus 220 similarly to the first embodiment.

(3) Third Embodiment

Figure 8:
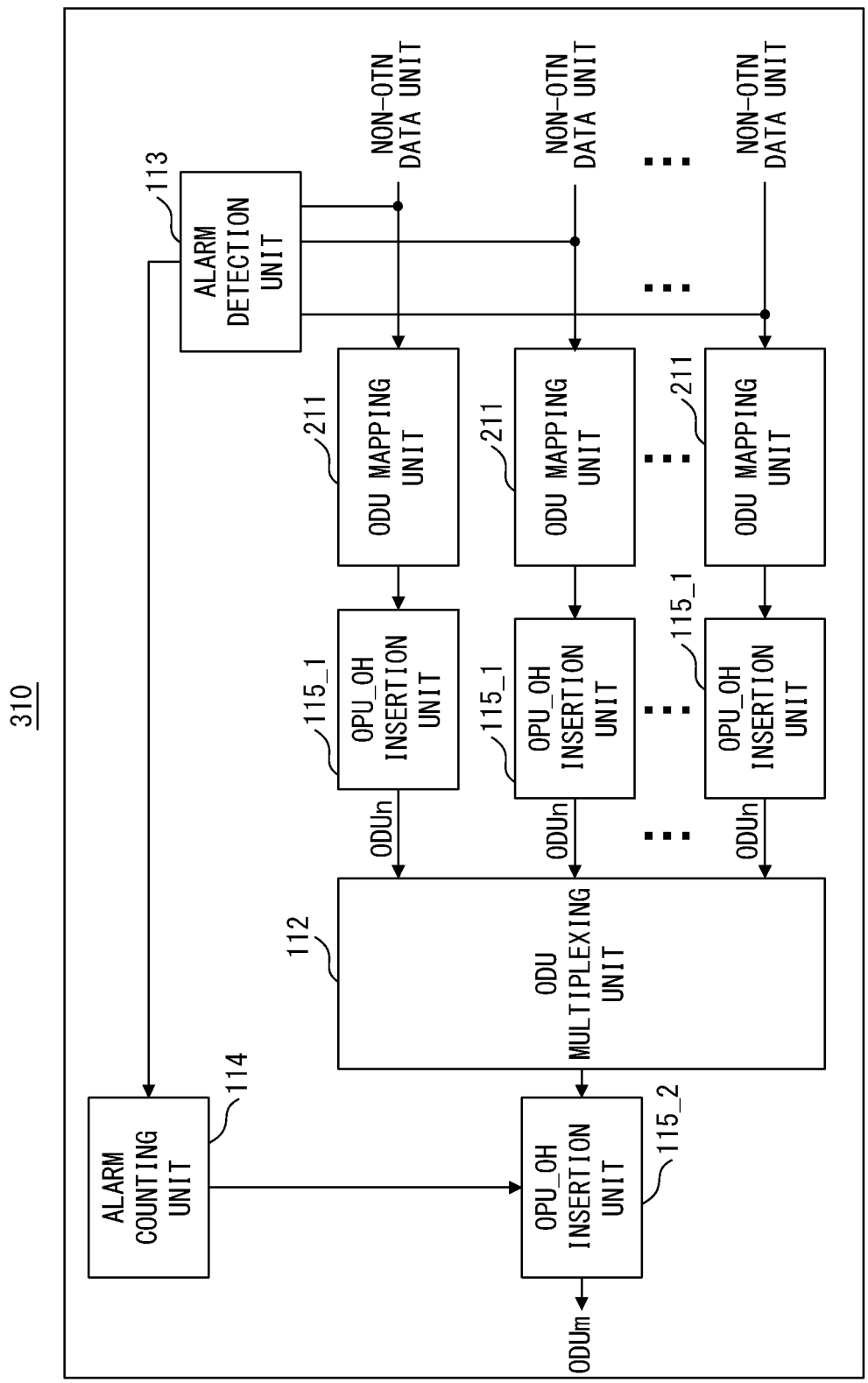
FIG. 8 is a block diagram illustrating one example of a configuration of a transmission apparatus according to a third embodiment.
Figure 9:
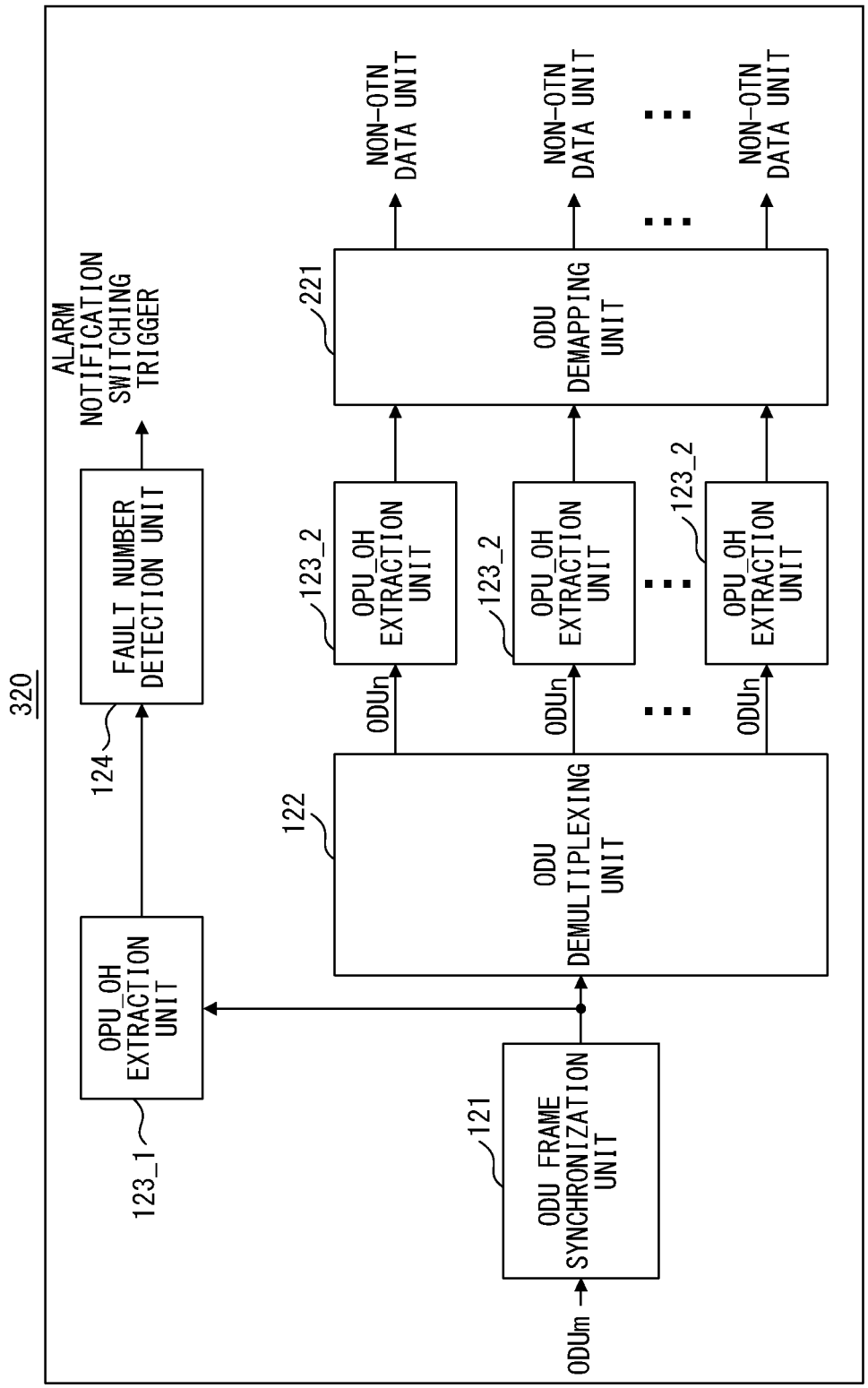
FIG. 9 is a block diagram illustrating one example of a configuration of a reception apparatus according to the third embodiment.

A transmission apparatus 310 and a reception apparatus 320 according to a third embodiment are described next with reference to FIGS. 8 and 9. Here, FIG. 8 is a block diagram illustrating one example of a configuration of the transmission apparatus 310 according to the third embodiment, whereas FIG. 9 is a block diagram illustrating one example of a configuration of the reception apparatus 320 according to the third embodiment. The same components as those included in the transmission apparatus 110 and the reception apparatus 120 according to the above described first embodiment and the transmission apparatus 210 and the reception apparatus 220 according to the second embodiment are denoted with the same reference numerals, and their detailed descriptions are omitted.

As illustrated in FIG. 8, the transmission apparatus 310 according to the third embodiment is different from the transmission apparatus 210 according to the second embodiment for mapping a non-OTN data unit of 1 channel in an ODUm in that non-OTN data units of x channels are mapped in an ODUm. Specifically, the transmission apparatus 310 according to the third embodiment includes x ODU mapping units 211 corresponding to one specific example of "a generation unit", x OPU_OH insertion units 115_1, an ODU multiplexing unit 112 corresponding to one specific example of "a generation unit", an alarm detection unit 113, an alarm counting unit 114, and an OPU_OH insertion unit 115_2 corresponding to one specific example of "an addition unit".

To each of the x ODU mapping units 211, a corresponding non-OTN data unit of 1 channel among the non-OTN data units of x channels is input. Each of the x ODU mapping units 211 maps the corresponding non-OTN data unit of 1 channel in an OPU payload part 133 of the ODUn which is a data unit conforming to OTN. Each of the x ODU mapping units 211 outputs the ODUn in which the corresponding non-OTN data unit of 1 channel is mapped to one corresponding OPU_OH insertion unit 115_1 among the x OPU_OH insertion units 115_1.

Each of the x OPU_OH insertion units 115_1 inserts various items of information in the OPU overhead part 132 of the ODUn output from the one corresponding ODU mapping unit 211. Thereafter, each of the x OPU_OH insertion units 115 outputs the ODUn having the OPU overhead part 132 in which various items of information are inserted to the ODU multiplexing unit 112. Accordingly, the ODUns of x channels are input to the ODU multiplexing unit 112.

The ODU multiplexing unit 112 multiplexes the low-order ODUns of x channels. Specifically, the ODU multiplexing unit 112 multiplexes the low-order ODUns of x channels into an OPU payload part 133 of a high-order ODUm. The ODU multiplexing unit 112 outputs the high-order ODUm having the OPU payload part 133 into which the low-order ODUns of the x channels are multiplexed to the OPU_OH insertion unit 115_2.

In the meantime, to the alarm detection unit 113, the non-OTN data units of x channels are input. The alarm detection unit 113 detects whether or not a fault occurs in the non-OTN data units. In the third embodiment, the alarm detection unit 113 outputs an alarm indicating that a fault has been detected to the alarm counting unit 114 each time it detects a non-OTN data unit where a fault occurs.

The alarm counting unit 114 counts the number of alarms output from the alarm detection unit 113. The alarm counting unit 114 outputs the number of counted alarms to the OPU_OH insertion unit 115_2 in synchronization with a cycle where the non-OTN data units of x channels are mapped (in other words, a cycle where an ODUm is generated).

The OPU_OH insertion unit 115_2 inserts the fault number data 138 indicating the number of alarms output from the alarm counting unit 114 in a specified data portion (such as the above described RES area 137 within the PSI 134) of the OPU overhead part 132 of the ODUm. Namely, the OPU_OH insertion unit 115_2 inserts the fault number data 138 indicating the number of non-OTN data units where a fault occurs among the non-OTN data units of x channels mapped in the ODUm in the specified data portion of the OPU overhead part 132 of the ODUm.

As illustrated in FIG. 9, the reception apparatus 320 according to the third embodiment is different from the reception apparatus 220 according to the second embodiment for obtaining a non-OTN data unit of 1 channel mapped in an ODUm in that non-OTN data units of x channels mapped in an ODUm are obtained. Specifically, the reception apparatus 320 according to the third embodiment includes an ODU frame synchronization unit 121 corresponding to one specific example of "an obtainment unit", an ODU demultiplexing unit 122, x OPU_OH extraction units 123_2, an ODU demapping unit 221, an OPU_OH extraction unit 123_1 corresponding to one specific example of "an obtainment unit", and a fault number detection unit 124 corresponding to one specific example of "an obtainment unit".

To the ODU frame synchronization unit 121, an ODUm transmitted, for example, from the transmission apparatus 310 as opposed to the reception apparatus 320 is input. The ODU frame synchronization unit 121 outputs the ODUm to the ODU demultiplexing unit 122 and the OPU_OH extraction unit 123_1 after synchronizing the ODUm.

The ODU demultiplexing unit 122 demultiplexes low-order ODUns of x channels from the high-order ODUm. Thereafter, the ODU demultiplexing unit 122 outputs each of the low-order ODUns of x channels to one corresponding OPU_OH extracting 123_2 among the x OPU_OH extraction units 123_2.

Each of the x OPU_OH extraction units 123_2 extracts an OPU overhead part 132 from a corresponding ODUn of 1 channel among the low-order ODUns of x channels. Thereafter, each of the x OPU_OH extraction units 123_2 outputs the corresponding ODUn of 1 channel among the low-order ODUns of x channels to the ODU demapping unit 221.

The ODU demapping unit 221 extracts a non-OTN data unit from each of the ODUns of x channels. Namely, the ODU demapping unit 221 extracts non-OTN data units of x channels from the ODUns of x channels. The ODU demapping unit 221 may output each of the extracted non-OTN data units to a processing unit for executing various types of processes for each of the non-OTN data units when needed.

The OPU_OH extraction unit 123_1 and the fault number detection unit 124 perform operations similar to those of the first embodiment. Namely, the OPU_OH extraction unit 123_1 extracts the OPU overhead part 132 of the ODUm, and the fault number detection unit 124 extracts fault number data 138 from the OPU overhead part 132 extracted by the OPU_OH extraction unit 123_1.

As described above, according to the third embodiment, effects similar to the various types of effects produced by the transmission apparatus 110 or the reception apparatus 120 according to the above described first embodiment can be benefited also in the case where non-OTN data units of a plurality of channels are mapped in an ODUm. Namely, the reception apparatus 320 can obtain fault number data 138 from an ODUm without synchronizing non-OTN data units of a plurality of channels included in the ODUm. Accordingly, the reception apparatus 320 can recognize a fault state of the mapped non-OTN data units of a plurality of channels without synchronizing the non-OTN data units included in the ODUm. Therefore, the reception apparatus 320 may not include a plurality of synchronization circuits for synchronizing non-OTN data units of a plurality of channels which are conventionally needed to recognize a fault state of the mapped non-OTN data units of the plurality of channels. Therefore, according to the third embodiment, the reception apparatus 320 can be caused to preferably recognize a fault state of non-OTN data units of a plurality of channels mapped in an ODUm while relatively reducing a circuit scale or a processing load of the reception apparatus 320 similarly to the first embodiment.

(4) Fourth Embodiment

Figure 10:
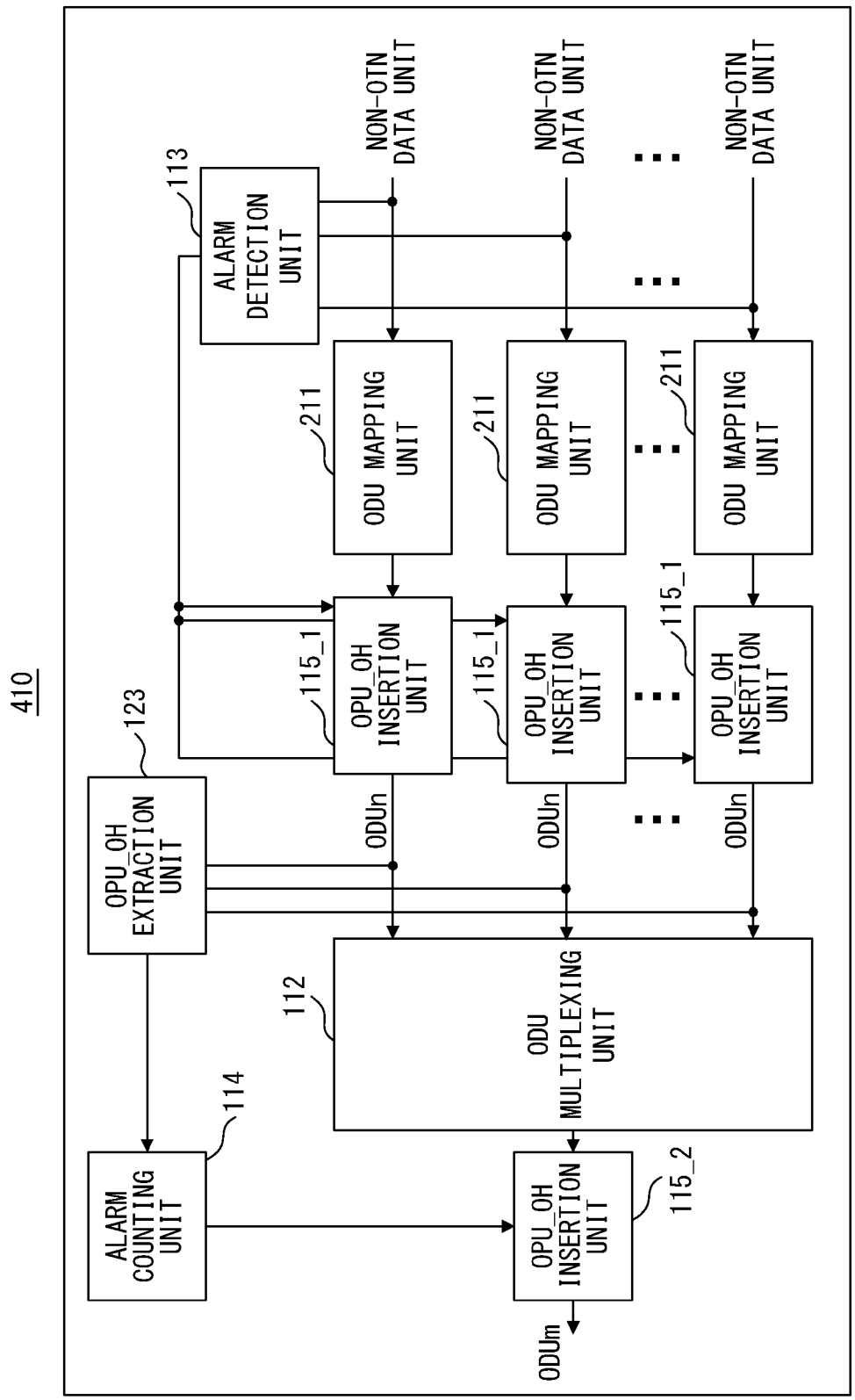
FIG. 10 is a block diagram illustrating one example of a configuration of a transmission apparatus according to a fourth embodiment.

A transmission apparatus 410 according to a fourth embodiment is described next with reference to FIG. 10. Here, FIG. 10 is a block diagram illustrating one example of a configuration of the transmission apparatus 410 according to the fourth embodiment. The same components as those included in the transmission apparatus 110 and the reception apparatus 120 according to the above described first embodiment to the transmission apparatus 310 and the reception apparatus 320 according to the third embodiment are denoted with the same reference numerals, and their detailed descriptions are omitted.

As illustrated in FIG. 10, the transmission apparatus 410 according to the fourth embodiment is different from the transmission apparatus 310 according to the third embodiment for inserting fault number data 138 in a high-order ODUm based on an alarm detected before non-OTN data units are mapped in a low-order ODUn in that fault number data 138 is inserted in a high-order ODUm based on an overhead part 132 extracted from a low-order ODUn after non-OTN data units are mapped in the low-order ODUn. Specifically, the transmission apparatus 410 according to the fourth embodiment includes x ODU mapping units 211 corresponding to one specific example of "a generation unit", x OPU_OH insertion units 115_1, an ODU multiplexing unit 112 corresponding to one specific example of "a generation unit", an alarm detection unit 113, an OPU_OH extraction unit 123, an alarm counting unit 114, and an OPU_OH insertion unit 115_2 corresponding to one specific example of "an addition unit".

Each of the x ODU mapping units 211 maps a corresponding non-OTN data unit of 1 channel in an OPU payload part 133 of an ODUn which is a data unit conforming to OTN, and outputs the non-OTN data unit to one corresponding OPU_OH insertion unit 115_1.

In the meantime, the alarm detection unit 113 detects whether or not a fault occurs in the non-OTN data unit. In the fourth embodiment, the alarm detection unit 113 outputs an alarm indicating that a fault has been detected to one corresponding OPU_OH insertion unit 115_1 among the x OPU_OH insertion units 115_1 each time it detects a non-OTN data unit where a fault occurs.

Each of the x OPU_OH insertion units 115_1 inserts fault number data 138 indicating whether or not a fault occurs in a corresponding non-OTN data unit of 1 channel in an OPU overhead part 132 of a corresponding ODUn of 1 channel based on an alarm output from the alarm detection unit 113. Thereafter, each of the x OPU_OH insertion units 115_1 outputs the ODUn having the OPU overhead part 132 in which various items of information are inserted to the ODU multiplexing unit 112 and the OPU_OH extraction unit 123.

The ODU multiplexing unit 112 multiplexes low-order ODUns of x channels. The ODU multiplexing unit 112 outputs a high-order ODUm having an OPU payload part 133 into which the low-order ODUns of x channels are multiplexed to the OPU_OH insertion unit 115_2.

In the meantime, the OPU_OH extraction unit 123 extracts the OPU overhead part 132 from each of the low-order ODUns of x channels. Thereafter, the OPU_OH extraction unit 123 outputs the extracted x OPU overhead parts 132 to the alarm counting unit 114.

The alarm counting unit 114 outputs the number of non-OTN data units where a fault occurs among the non-OTN data units of x channels to the OPU_OH insertion unit 115_2 based on the x OPU overhead parts 132 output from the OPU_OH extraction unit 123.

The OPU_OH insertion unit 115_2 inserts fault number data 138 indicating the number of faults output from the alarm counting unit 114 in a specified data portion (such as the above described RES area 137 within the PSI 134) of the OPU overhead part 132 of the ODUm. Namely, the OPU_OH insertion unit 115_2 inserts the fault number data 138 indicating the number of non-OTN data units where a fault occurs among the non-OTN data units of x channels mapped in the ODUm in the specified data portion of the OPU overhead part 132 of the ODUm. As a result, the transmission apparatus 410 according to the fourth embodiment can generate an ODUm similar to that generated by the transmission apparatus 310 according to the third embodiment.

As described above, with the transmission apparatus 410 according to the fourth embodiment, effects similar to the various types of effects produced by the transmission apparatus 310 according to the third embodiment can be benefited. In addition, with the transmission apparatus 410 according to the fourth embodiment, the above described various types of effects can be benefited also in the case where a process block including the x ODU mapping units 211, the x OPU_OH insertion units 115_1, and the alarm detection unit 113, and a process block including the ODU multiplexing unit 112, the OPU_OH extraction unit 123, the alarm counting unit 114, and the OPU_OH insertion unit 115_2 are physically or logically separated.

(5) Fifth Embodiment

Figure 11A:
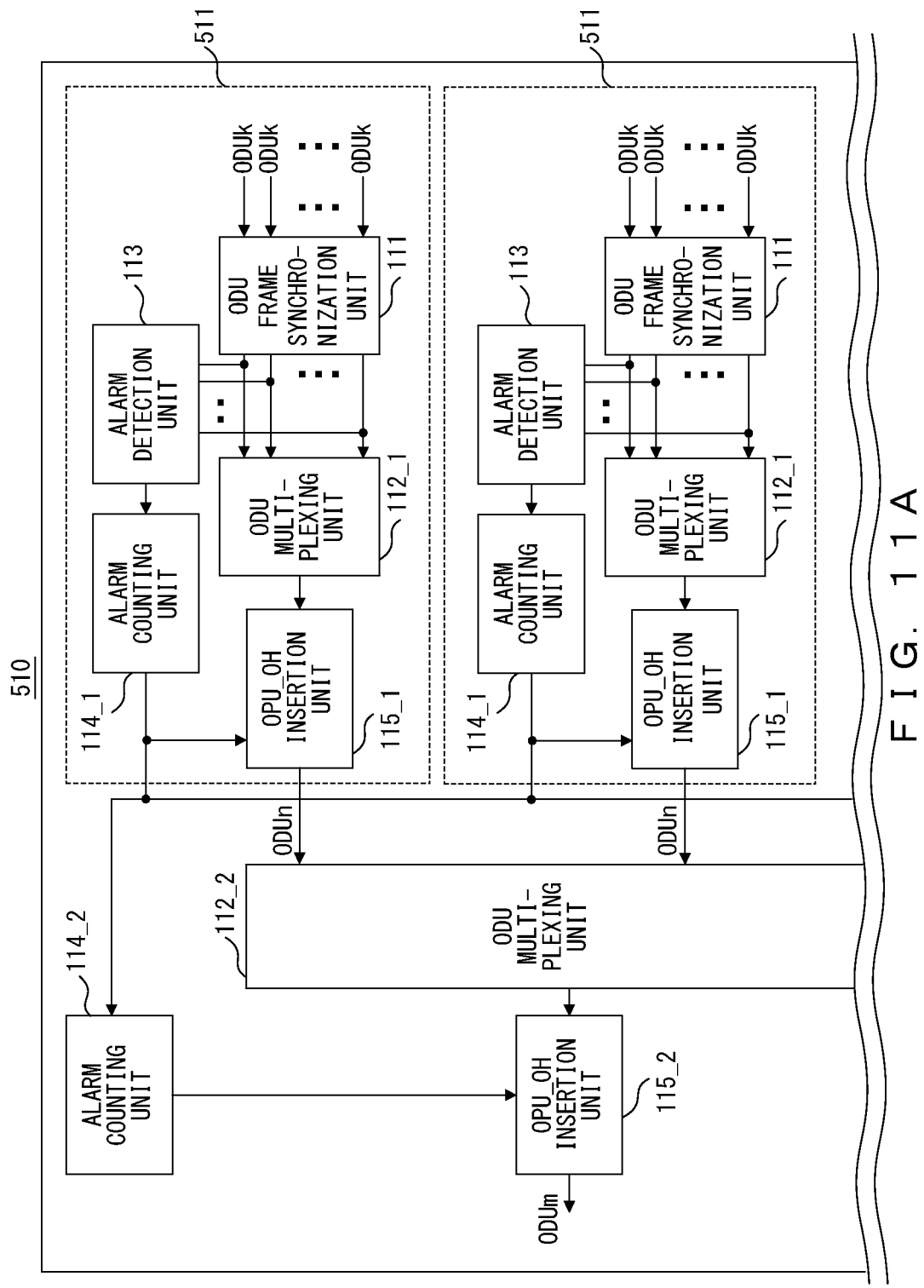
FIGS. 11A and 11B are a block diagram illustrating one example of a configuration of a transmission apparatus according to a fifth embodiment.
Figure 11B:
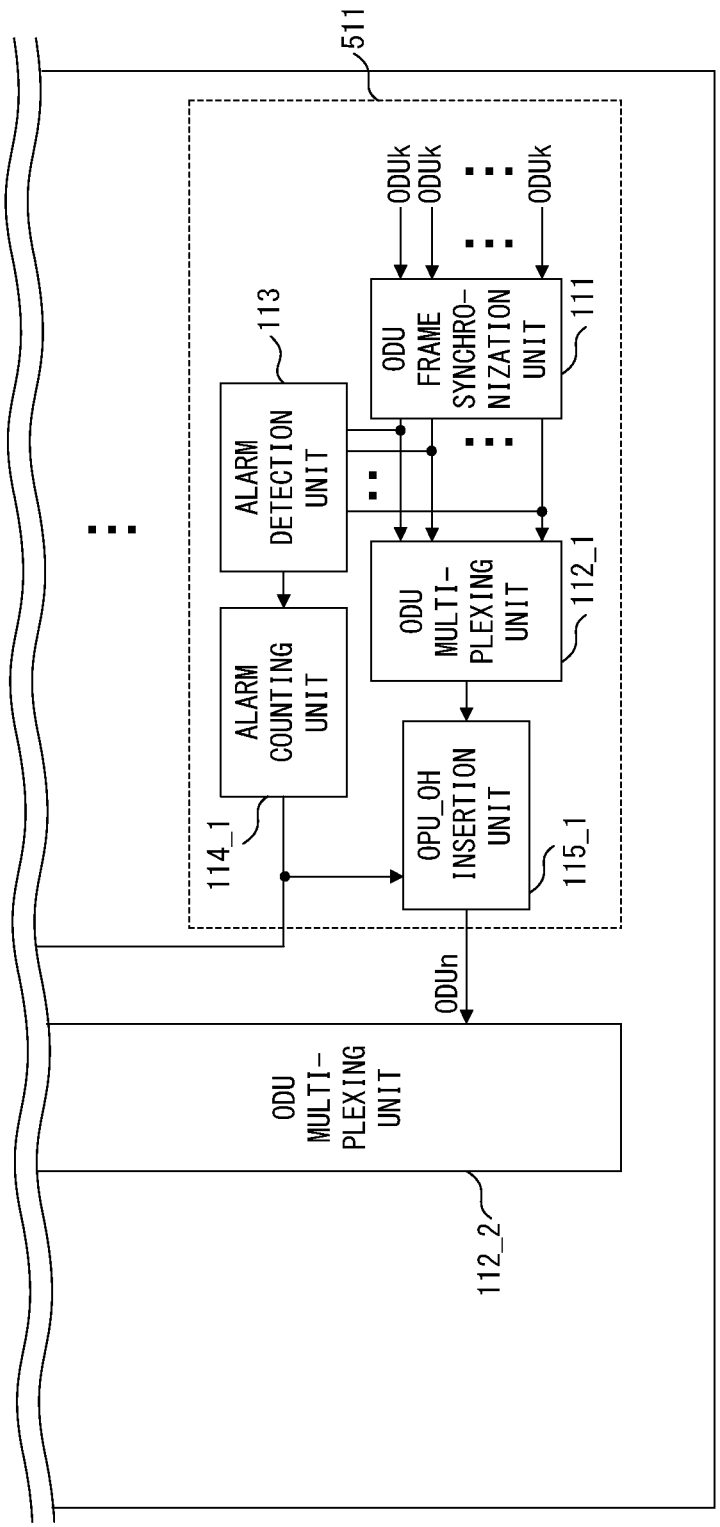
Figure 13A:
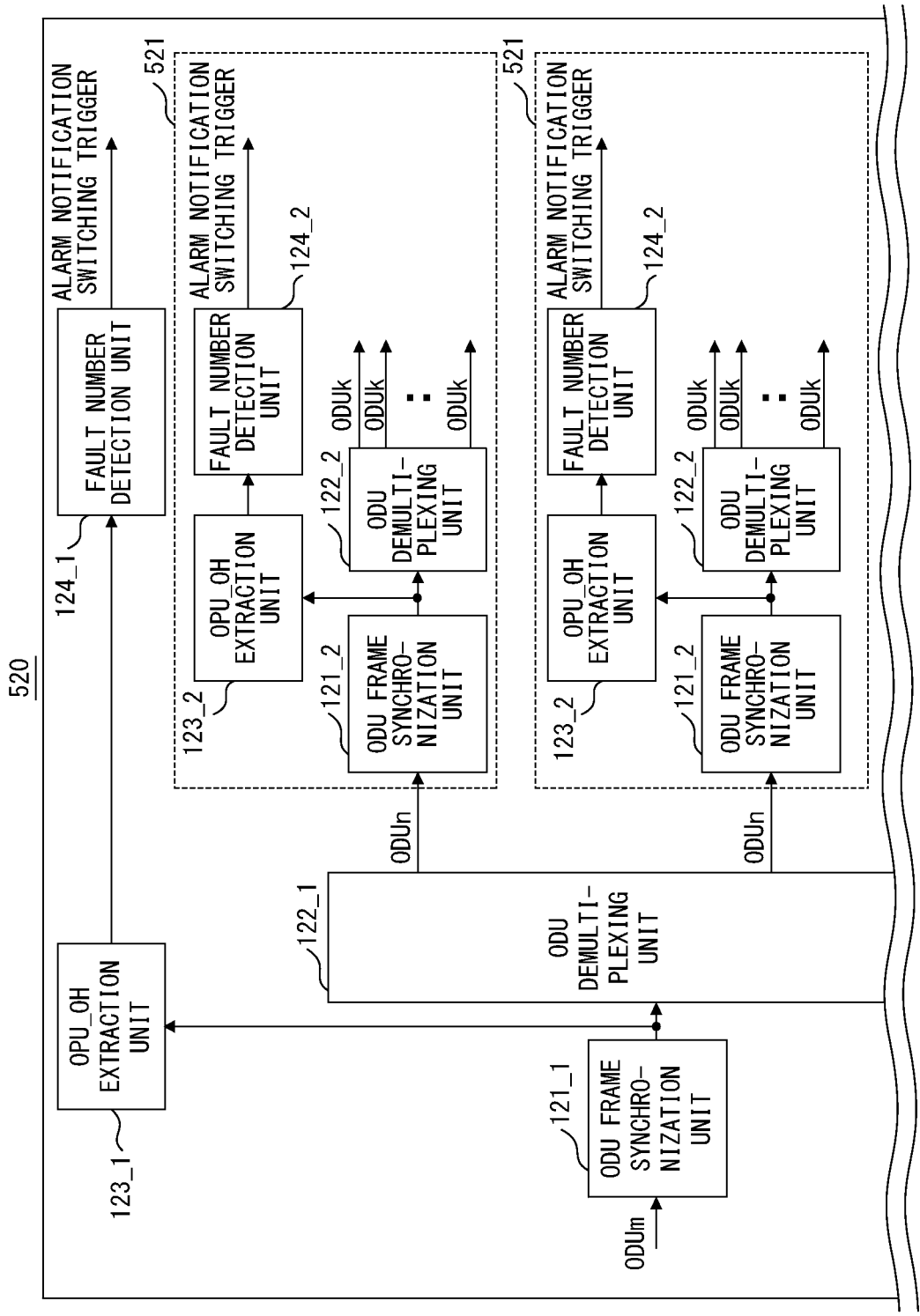

A transmission apparatus 510 and a reception apparatus 520 according to a fifth embodiment are described next with reference to FIG. 11 including FIGS. 11A and 11B to FIG. 13 including FIGS. 13A and 13B. Here, FIG. 11 is a block diagram illustrating one example of a configuration of the transmission apparatus 510 according to the fifth embodiment, FIG. 12 is a schematic illustrating a specific example of a data structure of an ODU to which fault number data 138 is added, and FIG. 13 is a block diagram illustrating one example of a configuration of the reception apparatus 520 according to the fifth embodiment. The same components as those included in the transmission apparatus 110 and the reception apparatus 120 according to the above described first embodiment to the transmission apparatus 410 and the reception apparatus 420 according to the fourth embodiment are denoted with the same reference numerals, and their detailed descriptions are omitted.

As illustrated in FIG. 11 including FIGS. 11A and 11B, the transmission apparatus 510 according to the fifth embodiment is different from the transmission apparatus 110 according to the first embodiment for multiplexing an ODU of one stage in that ODUs of 2 stages (or 3 or more stages) are multiplexed. Specifically, the transmission apparatus 510 according to the fifth embodiment includes x transmission process blocks 511 each of which includes an ODU frame synchronization unit 111, an ODU multiplexing unit 112_1 corresponding to one specific example of "a generation unit", an alarm detection unit 113, an alarm counting unit 114_1, and an OPU_OH insertion unit 115_1 corresponding to one specific example of "an addition unit". The transmission apparatus 510 according to the fifth embodiment also includes an ODU multiplexing unit 112_2 corresponding to one specific example of "a generation unit", an alarm counting unit 114_2, and an OPU_OH insertion unit 115_2 corresponding to one specific example of "an addition unit".

Each of the x transmission process blocks 511 has a configuration similar to that of the transmission apparatus 110 according to the first embodiment.

Specifically, to the ODU frame synchronization unit 111 included in each of the x transmission process blocks 511, low-order ODUks (k is an integer that satisfies k<n) of y channels (y is an integer equal to or larger than 1) are input. The low-order ODUks correspond to one specific example of "a third data unit". The ODU frame synchronization unit 111 outputs the low-order ODUks of y channels to the ODU multiplexing unit 112_1 and the alarm detection unit 113 after synchronizing the low-order ODUks of y channels.

The ODU multiplexing unit 112_1 included in each of the x transmission process blocks 511 multiplexes the low-order ODUks of y channels. Specifically, the ODU multiplexing unit 112_1 multiplexes the low-order ODUks of y channels into an OPU payload part 133 of an ODUn higher than the ODUk. The ODU multiplexing unit 112_1 outputs the high-order ODUn having the OPU payload part 133 into which the low-order ODUks of y channels are multiplexed to the OPU_OH insertion unit 115_1.

In the meantime, the alarm detection unit 113 included in each of the x transmission process blocks 511 detects whether or not a fault occurs in each of the low-order ODUks of y channels.

The alarm detection unit 113 outputs an alarm indicating that a fault has been detected to the alarm counting unit 114_1 each time it detects a low-order ODUk where a fault occurs.

The alarm counting unit 114_1 included in each of the x transmission process blocks 511 counts the number of alarms output from the alarm detection unit 113. The alarm counting unit 114_1 outputs the number of counted alarms to the OPU_OH insertion unit 115 and the alarm counting unit 114_2 in synchronization with a cycle where ODUks are multiplexed (in other words, a cycle where a high-order ODUn is generated).

The OPU_OH insertion unit 115_1 included in each of the x transmission process blocks 511 inserts various items of information in an OPU overhead part 132 of the high-order ODUn output from the ODU multiplexing unit 112_1. In the fifth embodiment, the OPU_OH insertion unit 115_1 inserts fault number data 138 indicating the number of alarms output from the alarm counting unit 114_1 in a specified data portion (such as the above described RES area 137 within the PSI 134) of the OPU overhead part 132 of the high-order ODUn. Namely, the OPU_OH insertion unit 115_1 inserts the fault number data 138 indicating the number of ODUks where a fault occurs (or the number of tributary slots configuring the ODUk where a fault occurs) among the low-order ODUks of y channels multiplexed into the high-order ODUn in the specified data portion of the OPU overhead part 132 of the high-order ODUn. Thereafter, the OPU_OH insertion unit 115_1 outputs the high-order ODUn to the ODU multiplexing unit 112_2. Accordingly, high-order ODUns of x channels are input to the ODU multiplexing unit 112_2.

The ODU multiplexing unit 112_2 multiplexes the high-order ODUns of x channels. Specifically, the ODU multiplexing unit 112_2 multiplexes the high-order ODUns of x channels into an OPU payload part 133 of a higher-order ODUm. The ODU multiplexing unit 112_2 outputs the higher-order ODUm having the OPU payload part 133 into which the high-order ODUns of x channels are multiplexed to the OPU_OH insertion unit 115_2.

In the meantime, the alarm counting unit 114_2 outputs a total of the numbers of alarms output from the alarm counting units 114_1 to the OPU_OH insertion unit 115_2. Namely, the alarm counting unit 114_2 outputs the total of the numbers of alarms counted by the x alarm counting units 114 included in the x transmission process blocks 511 to the OPU_OH insertion unit 115_2.

The OPU_OH insertion unit 115_2 inserts fault number data 138 indicating the number of alarms output from the alarm counting unit 114_2 in a specified data portion (such as the above described RES area 137 within the PSI 134) of the OPU overhead part 132 of the higher-order ODUm output from the ODU multiplexing unit 112_2. Namely, the OPU_OH insertion unit 115_2 inserts, in the specified data portion of the OPU overhead part 132 of the higher-order ODUm, the fault number data 138 indicating the number of ODUks where a fault occurs (or the number of tributary slots configuring an ODUk where a fault occurs) among the low-order ODUks of xxy channels that are further multiplexed into the high-order ODUns of x channels multiplexed into the higher-order ODUm.

A specific example of the fault number data 138 in the fifth embodiment is described with reference to FIG. 12. An example where ODU0s of y=8 channels (namely, low-order ODUks) are multiplexed into an ODU2 (namely, a high-order ODUn) and ODU2s of X=2 channels are multiplexed into an ODU4 (namely, a higher-order ODUm) as illustrated in FIG. 12 is described. In this case, the ODU multiplexing unit 112_1 included in each of two transmission process blocks 511 multiplexes the ODU0s of 8 channels output from the ODU frame synchronization unit 111 into an OPU payload part 133 of the ODU2. Here, assume that a fault occurs in the ODU0s of 4 channels among the ODU0s of 8 channels to be multiplexed into the first ODU2 illustrated relatively on the left side of FIG. 12, and a fault occurs in the ODU0s of 2 channels among the ODU0s of 8 channels to be multiplexed into the second ODU2 illustrated relatively on the right side of FIG. 12. In this case, the alarm detection unit 113 included in the transmission process block 511 for generating the first ODU2 outputs an alarm to the alarm counting unit 114_1 each time it detects each of the ODU0s of 4 channels where a fault occurs. Accordingly, the number of alarms counted by the alarm counting unit 114_1 included in the transmission process block 511 for generating the first ODU2 results in "4". Therefore, in the example illustrated in FIG. 12, the fault number data 138 inserted in the RES area 137 within the PSI 134 included in the OPU overhead part 132 of the first ODU2 includes information "4(ODU)". Similarly, the alarm detection unit 113 included in the transmission process block 511 for generating the second ODU2 outputs an alarm to the alarm counting unit 114_1 each time it detects each of the ODU0s of 2 channels where a fault occurs. Accordingly, the number of alarms counted by the alarm counting unit 114_1 included in the transmission process block 511 for generating the second ODU2 results in "2". Therefore, in the example illustrated in FIG. 12, the fault number data 138 inserted in the RES area 137 within the PSI 134 included in the OPU overhead part 132 of the second ODU2 includes information "2(ODU)".

In addition, the number of alarms "4" counted by the alarm counting unit 114_1 included in the transmission process block 511 for generating the first ODU2, and the number of alarms "2" counted by the alarm counting unit 114_1 included in the transmission process block 511 for generating the second ODU2 are further output to the alarm counting unit 114_2. Accordingly, the total of the numbers of alarms counted by the alarm counting unit 114_2 results in "6" . Therefore, the fault number data 138 inserted in the RES area 137 within the PSI 134 included in the OPU overhead part 132 of the ODU4 includes information "6(ODU)".

The reception apparatus 520 according to the fifth embodiment is described next. As illustrated in FIG. 13 including FIGS. 13A and 13B, the reception apparatus 520 according to the fifth embodiment is different from the reception apparatus 120 according to the first embodiment for demultiplexing a multiplexed ODU of one stage in that multiplexed ODUs of two stages (or three or more stages) are demultiplexed. Specifically, the reception apparatus 520 according to the fifth embodiment includes an ODU frame synchronization unit 121_1 corresponding to one specific example of "an obtainment unit", an OPU_OH extraction unit 123_1 corresponding to one specific example of "an extraction unit", a fault number detection unit 124_1 corresponding to one specific example of "an extraction unit", an ODU demultiplexing unit 122_1, and x reception process blocks 521. Each of the x reception process blocks 521 includes an ODU frame synchronization unit 121_2 corresponding to one specific example of "an obtainment unit", an ODU demultiplexing unit 122_2, an OPU_OH extraction unit 123_2 corresponding to one specific example of "an extraction unit", and a fault number detection unit 124_2 corresponding to one specific example of "an extraction unit".

To the ODU frame synchronization unit 121_1, a high-order ODUm transmitted, for example, from the transmission apparatus 510 as opposed to the reception apparatus 520 is input. The ODU frame synchronization unit 121_1 outputs the high-order ODUm to the ODU demultiplexing unit 122_1 and the OPU_OH extraction unit 123_1 after synchronizing the high-order ODUm.

The OPU_OH extraction unit 123_1 extracts an OPU overhead part 132 of the high-order ODUm. Thereafter, the OPU_OH extraction unit 123_1 outputs the extracted OPU overhead part 132 to the fault number detection unit 124_1.

The fault number detection unit 124_1 extracts fault number data 138 from the OPU overhead part 132 extracted by the OPU_OH extraction unit 123_1. As a result, the fault number detection unit 124_1 can recognize the number of ODUks or tributary slots where a fault occurs by regarding, as targets, the lower-order ODUks of xxy channels that are further multiplexed into low-order ODUns of x channels multiplexed into the high-order ODUm input to the ODU frame synchronization unit 121. Consequently, the fault number detection unit 124_1 outputs an alarm notification switching trigger for controlling a selection operation or a switching operation of a transmission path based on the recognized fault state.

In the meantime, the ODU demultiplexing unit 122_1 demulitiplexes the low-order ODUns of x channels from the high-order ODUm. Thereafter, the ODU demultiplexing unit 122_1 may output each of the demultiplexed low-order ODUns of x channels to the ODU frame synchronization unit 121_2 included in one corresponding reception process block 521 among the x reception process blocks 521.

To the ODU frame synchronization unit 121_2 included in each of the x reception process blocks 521, a corresponding ODUn of 1 channel among the low-order ODUns of x channels is input. The ODU frame synchronization unit 121_2 outputs the low-order ODUn to the ODU demultiplexing unit 122_2 and the OPU_OH extraction unit 123_2 after synchronizing the low-order ODUn.

The ODU demultiplexing unit 122_2 included in each of the x reception process blocks 521 demultiplexes lower-order ODUks of y channels from the low-order ODUn. The ODU demultiplexing unit 122_2 may output the demultiplexed low-order ODUks of y channels to a processing unit for executing various types of processes for the corresponding ODUk when needed.

In the meantime, the OPU_OH extraction unit 123_2 included in each of the x reception process blocks 521 extracts an OPU overhead part 132 of the low-order ODUn. Thereafter, the OPU_OH extraction unit 123_2 outputs the extracted OPU overhead part 132 to the fault number detection unit 124_2.

The fault number detection unit 124_2 included in each of the x reception process blocks 521 extracts fault number data 138 from the OPU overhead part 132 extracted by the OPU_OH extraction unit 123_2. As a result, the fault number detection unit 124_2 can recognize the number of ODUks or tributary slots where a fault occurs by regarding, as targets, the lower-order ODUks of y channels multiplexed into the corresponding ODUn of 1 channel among the low-order ODUns of x channels . As a result, the fault number detection unit 124_2 outputs an alarm notification switching trigger for controlling a selection operation or a switching operation of a transmission path based on the recognized fault state.

As described above, according to the fifth embodiment, a fault state of the lowest-order ODUks multiplexed into the highest-order ODUm can be recognized by synchronizing the highest-order ODUm also in the case where ODUs of a plurality of stages are multiplexed. Therefore, according to the fifth embodiment, the above described various types of effects can be preferably benefited.

The example illustrated in FIGS. 11 to 13 refer to the example where the ODUs of two stages are multiplexed. However, the above described various types of effects can be preferably benefited by connecting transmission process blocks 511 or reception process blocks 521 of multiple stages also in the case where ODUs of three stages or more are multiplexed. Specifically, by configuring the transmission apparatus 510 so that each ODUn output from the OPU_OH insertion unit 115_1 or each ODUm output from the OPU_OH insertion unit 115_2 is sequentially input to transmission process blocks 511 of multiple stages newly provided according to the number of ODUs to be multiplexed, operations similar to the above described ones can be performed, and at the same time, the above described various types of effects can be benefited. Similarly, by configuring the reception apparatus 520 so that each ODUn output from the ODU demultiplexing unit 122_1 or each ODUk output from the ODU demultiplexing unit 122_2 is sequentially input to reception process blocks of multiple stages newly provided according to the number of ODUs to be multiplexed, operations similar to the above described ones can be performed, and at the same time, the above described various types of effects can be benefited.

(6) Sixth Embodiment

Figure 14A:
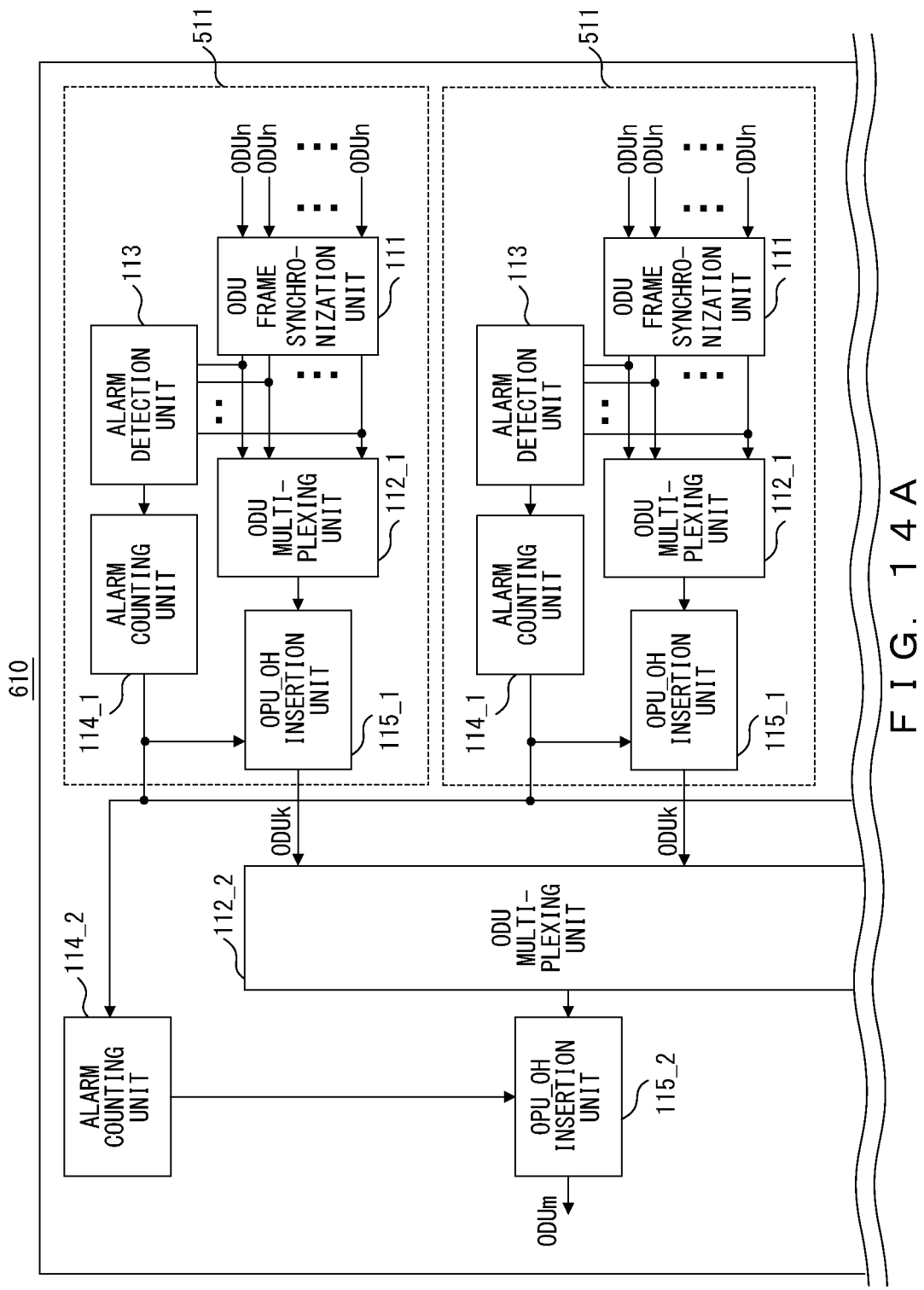
FIGS. 14A and 14B are a block diagram illustrating one example of a configuration of a transmission apparatus according to a sixth embodiment.
Figure 14B:
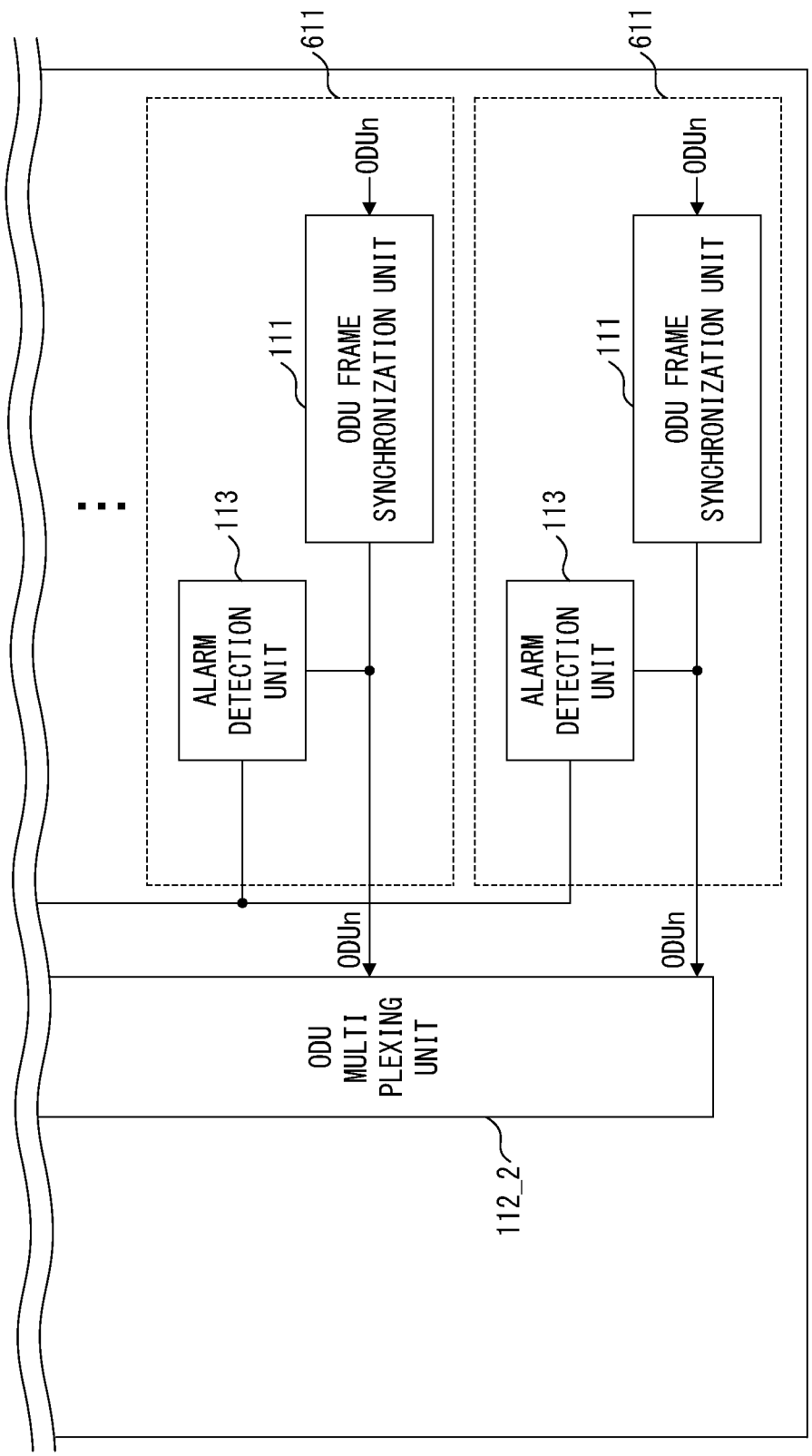
Figure 15:
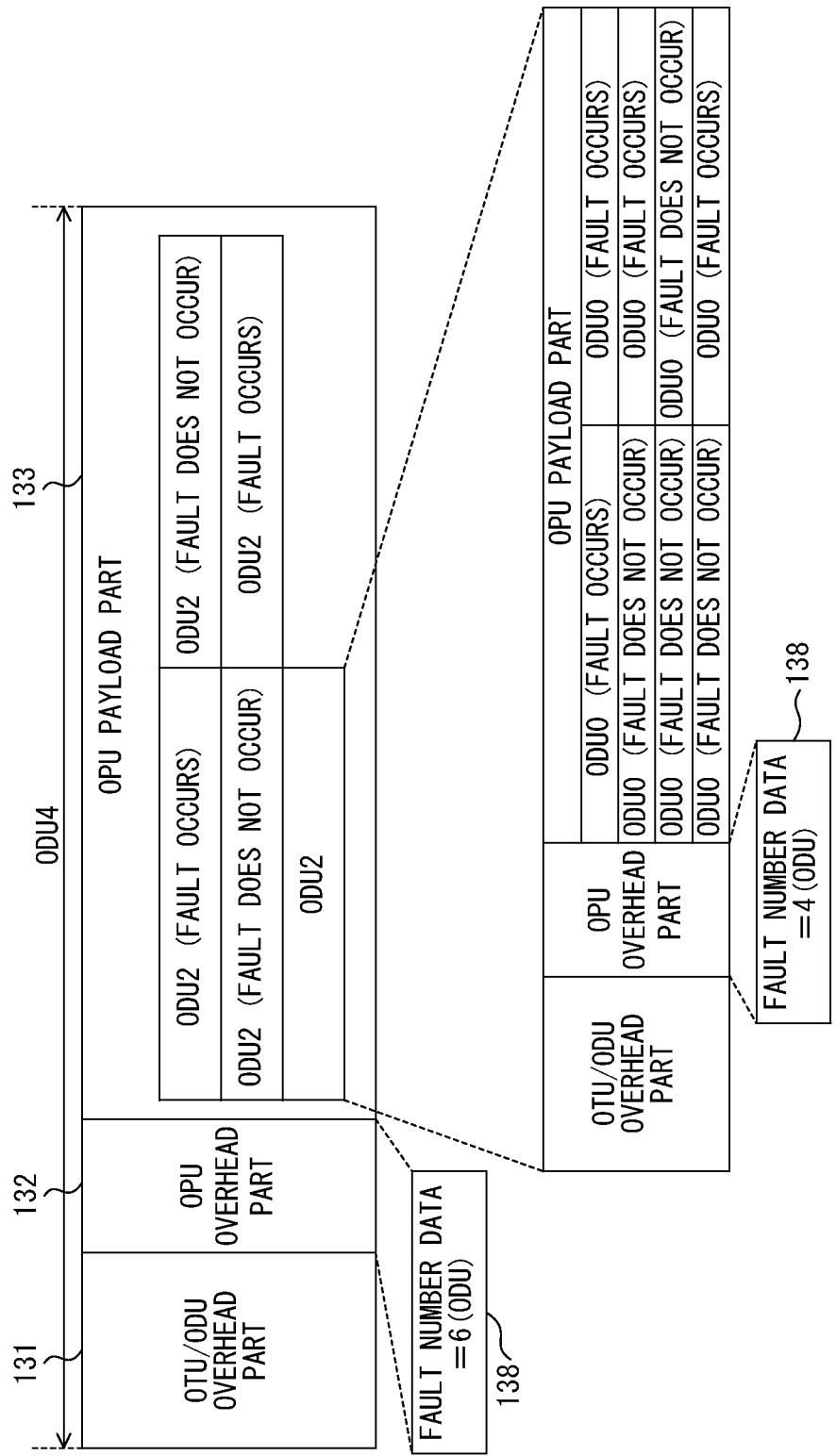
FIG. 15 is a schematic illustrating a specific example of a data structure of an ODU to which fault number data is added.

A transmission apparatus 610 and a reception apparatus 620 according to a sixth embodiment are described next with reference to FIG. 14 including FIGS. 14A and 14B to FIG. 16. Here, FIG. 14 is a block diagram illustrating one example of a configuration of the transmission apparatus 610 according to the sixth embodiment, FIG. 15 is a schematic illustrating a specific example of a data structure of an ODU to which fault number data 138 is added, and FIG. 16 is a block diagram illustrating one example of a configuration of the reception apparatus 620 according to the sixth embodiment. The same components as those included in the transmission apparatus 110 and the reception apparatus 120 according to the above described first embodiment to the transmission apparatus 510 and the reception apparatus 520 according to the fifth embodiment are denoted with the same reference numerals, and their detailed descriptions are omitted.

As illustrated in FIG. 14 including FIGS. 14A and 14B, the transmission apparatus 610 according to the sixth embodiment is different from the transmission apparatus 510 according to the fifth embodiment for further multiplexing an ODUn, into which ODUks are multiplexed, into an ODUm in that an ODUn into which ODUks are multiplexed, and an ODUn into which ODUks are not multiplexed are further multiplexed into an ODUm. Specifically, the transmission apparatus 610 according to the sixth embodiment is different from the transmission apparatus 510 according to the fifth embodiment in that z (z is an integer that satisfies 1≤z≤x) transmission process blocks 511 among the x transmission process blocks 511 are replaced with z transmission process blocks 611 each including an ODU frame synchronization unit 111 and an alarm detection unit 113.

To the ODU frame synchronization unit 111 included in each of the z transmission process blocks 611, an ODUn is directly input as a replacement for low-order ODUks of y channel. The ODU frame synchronization unit 111 outputs the ODUn to the ODU multiplexing unit 112_1 and the alarm detection unit 113 after synchronizing the ODUn.

The alarm detection unit 113 included in each of the z transmission process blocks 611 detects whether or not a fault occurs in the ODUn as a replacement for the low-order ODUks of y channels. The alarm detection unit 113 outputs an alarm indicating that a fault has been detected to the alarm counting unit 114_1 each time it detects an ODUn where a fault occurs.

In the meantime, the x-z transmission process blocks 511 perform operations similar to those of the fifth embodiment. As a result, to the ODU multiplexing unit 112_2, ODUns of x-z channels output from the x-z transmission process blocks 511 (namely, ODUns of x-z channels into each of which ODUks of y channels are multiplexed), and ODUns of z channels output from the z transmission process blocks 611 are input. Subsequent operations (namely, operations of the ODU multiplexing unit 112_2, the alarm counting unit 114_2 and the OPU_OH insertion unit 115_2) are performed similarly to the fifth embodiment.

A specific example of the fault number data 138 in the sixth embodiment is described with reference to FIG. 15. An example where ODU2s of x=5 channels including a first ODU2 of 1 channel into which ODU0s of y=8 channels are multiplexed, and second ODU2s of z=4 channels into which ODU0s are not multiplexed are multiplexed into an ODU4 as illustrated in FIG. 15 is described. In this case, the ODU multiplexing unit 112_1 included in one transmission process block 511 multiplexes the ODU0s of 8 channels output from the ODU frame synchronization unit 111 into an OPU payload part 133 of the first ODU2. Here, assume that a fault occurs in the ODU0s of 4 channels among the ODU0s of 8 channels multiplexed into the first ODU2. In this case, the alarm detection unit 113 included in the transmission process block 511 for generating the first ODU2 outputs an alarm to the alarm counting unit 114_1 each time it detects each of the ODU0s of 4 channels where a fault occurs. Accordingly, the number of alarms counted by the alarm counting unit 114_1 included in the transmission process block 511 for generating the first ODU2 results in "4". Therefore, in the example illustrated in FIG. 15, the fault number data 138 inserted in the RES area 137 within the PSI 134 included in the OPU overhead part 132 of the first ODU2 includes information "4(ODU)".

In the meantime, assume that a fault occurs in the ODU2s of 2 channels among the second ODU2s of 4 channels. In this case, the alarm detection unit 113 included in two transmission process blocks 611 among the 4 transmission process blocks 611 corresponding to the second ODU2s of 4 channels outputs an alarm to the alarm counting unit 114_2.

Accordingly, to the alarm counting unit 114_2, the number of alarms "4" counted by the alarm counting unit 114_1 included in the transmission process block 511 for generating the first ODU2, and the number of alarms "2" counted by the alarm detection unit 113 included in the two transmission process blocks 611 among the 4 transmission process blocks 611 corresponding to the second ODU2s of 4 channels are output. Therefore, in the example illustrated in FIG. 15, the fault number data 138 inserted in the RES area 137 within the PSI 134 included in the OPU overhead part 132 of the ODU4 includes information "6 (ODU)".

The reception apparatus 620 according to the sixth embodiment is described next. As illustrated in FIG. 16, the reception apparatus 620 according to the sixth embodiment is different from the reception apparatus 520 according to the fifth embodiment for demultiplexing an ODUm generated by further multiplexing an ODUn into which ODUks are multiplexed in that an ODUm generated by further multiplexing an ODUn into which ODUks are multiplexed, and an ODUn into which ODUks are not multiplexed is demultiplexed. Specifically, the reception apparatus 620 according to the sixth embodiment is different from the reception apparatus 520 according to the fifth embodiment in that z (z is an integer that satisfies $1 \leq z \leq x$) reception process blocks 521 among the x reception process blocks 521 are omitted. Namely, with the reception apparatus 620 according to the sixth embodiment, among the ODUns of x channels output from the ODU demultiplexing unit 122_1, (i) ODUks of x-z channels into which ODUks of y channels are multiplexed are output to x-z reception process blocks 521, and (ii) ODUks of z channels into which ODUks of y channels are not multiplexed are output unchanged to a processing unit for executing various type of processes. The other components and operations are similar to those of the reception apparatus 520 according to the fifth embodiment.

As described above, according to the sixth embodiment, the above described various types of effects can be preferably benefited also in the case where ODUs of a plurality of stages are multiplexed.

(7) Seventh Embodiment

Figure 17A:
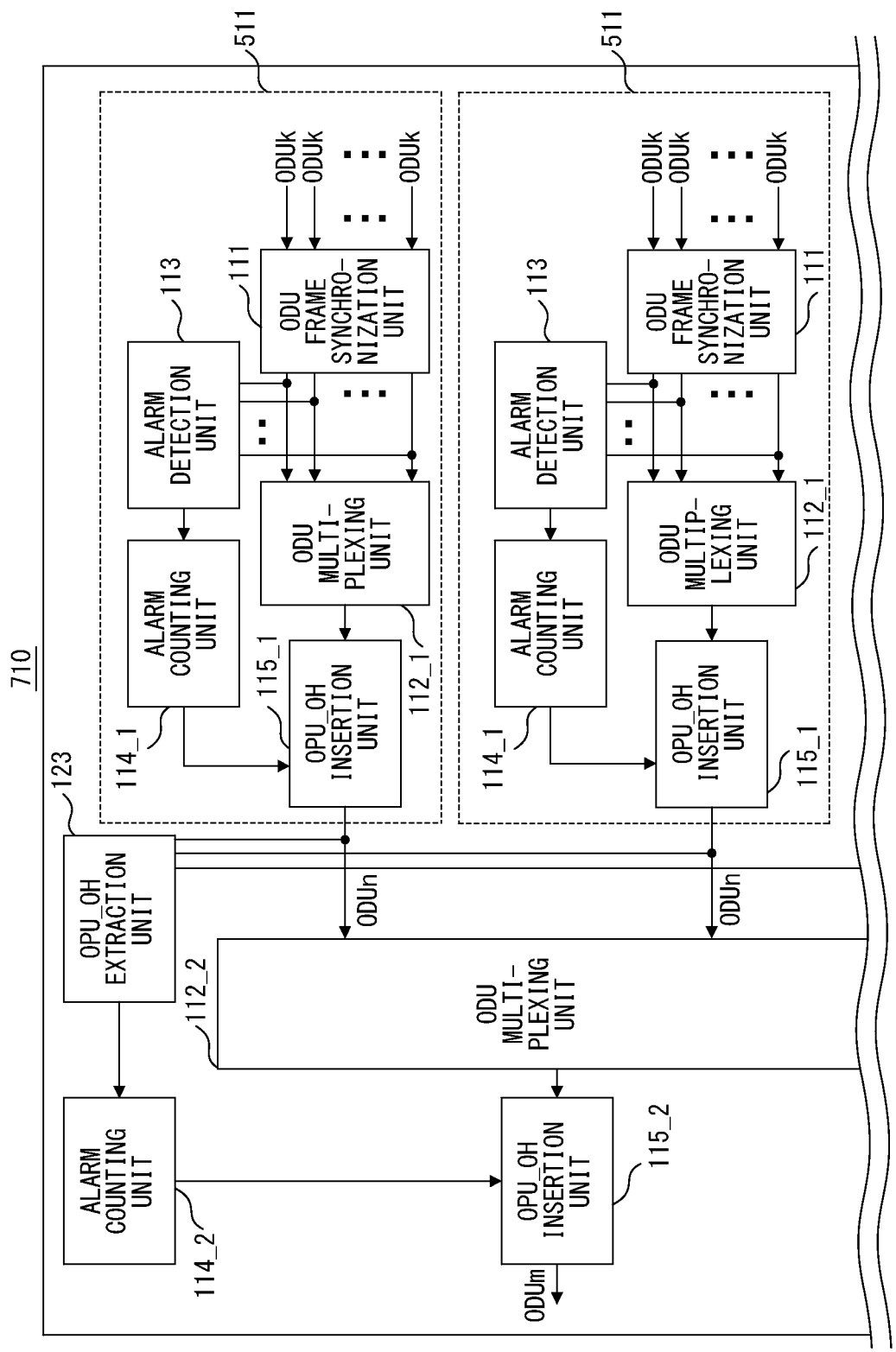

A transmission apparatus 710 according to a seventh embodiment is described next with reference to FIG. 17. Here, FIG. 17 including FIGS. 17A and 17B is a block diagram illustrating one example of a configuration of the transmission apparatus 710 according to the seventh embodiment. The same components as those included in the transmission apparatus 110 and the reception apparatus 120 according to the above described first embodiment to the transmission apparatus 610 and the reception apparatus 620 according to the sixth embodiment are denoted with the same reference numerals, and their detailed descriptions are omitted.

As illustrated in FIG. 17, the transmission apparatus 710 according to the seventh embodiment corresponds to a transmission apparatus implemented by applying the configuration of the transmission apparatus 410 according to the fourth embodiment to the transmission apparatus 510 according to the fifth embodiment. Specifically, the transmission apparatus 710 according to the seventh embodiment is different from the transmission apparatus 510 according to the fifth embodiment for outputting the number of alarms output from the alarm counting unit 114_1 included in each of the x transmission process blocks 511 to the alarm counting unit 114_2 in that OPU overhead parts 132 extracted from ODUns respectively output from the x transmission process blocks 511 are output to the alarm counting unit 114_2.

Specifically, the transmission apparatus 710 according to the seventh embodiment is different from the transmission apparatus 510 according to the fifth embodiment in that the alarm counting unit 114_1 outputs the number of counted alarms only to the OPU_OH insertion unit 115_1. Moreover, the transmission apparatus 710 according to the seventh embodiment is different from the transmission apparatus 510 according to the fifth embodiment in that an OPU_OH extraction unit 123 is further included. The OPU_OH extraction unit 123 extracts the OPU overhead parts 132 from the ODUns respectively output from the x transmission process blocks 511. The OPU_OH extraction unit 123 outputs the extracted x OPU overhead parts 132 to the alarm counting unit 114_2.

The alarm counting unit 114_2 outputs a total of the numbers of alarms counted by the x alarm counting units 114 included in the x transmission process blocks 511 to the OPU_OH insertion unit 115_2 based on the x OPU overhead parts 132 output from the OPU_OH extraction unit 123 similarly to the alarm counting unit 114 according to the fourth embodiment. As a result, the OPU_OH insertion unit 115_2 inserts fault number data 138 indicating the number of alarms output from the alarm counting unit 114_2 in a specified data portion (such as the above described RES area 137 within the PSI 134) of an OPU overhead part 132 of a higher-order ODUm output from the ODU multiplexing unit $112_{13}$ 2.

As described above, with the transmission apparatus 710 according to the seventh embodiment, effects similar to the various types of effects produced by the transmission apparatus 510 according to the fifth embodiment can be preferably benefited. Moreover, with the transmission apparatus 710 according to the seventh embodiment, the above described various types of effects can be benefited also in the case where a process block including the x transmission process blocks 511, and a process block including the ODU multiplexing unit 112_2, the OPU_OH extraction unit 123, the alarm counting unit 114_2 and the OPU_OH insertion unit 115_2 are physically or logically separated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus comprising:
    a generation unit configured to generate a first data unit including a second data unit; and
    an addition unit configured to add fault data indicating a first number of occurrences of faults in units of second data units, and a second number of occurrences of faults in units of divided units into which the second data unit is divided, to a data portion different from a data portion in which the second data unit is positioned within the first data unit.

2. The transmission apparatus according to claim 1, wherein
    the second data unit further includes a third data unit, and
    the addition unit adds fault data indicating a fault state of the third data unit to at least one of a data portion different from a data portion in which the second data unit is positioned within the first data unit, and a data portion different from a data portion in which the third data unit is positioned within the second data unit.

3. The transmission apparatus according to claim 1, wherein
    the generation unit generates a first data unit having a payload part including the second data unit, and
    the addition unit adds the fault data to an overhead part of the first data unit.

4. The transmission apparatus according to claim 1, wherein
    the generation unit generates the first data unit including a plurality of second data units, and
    the addition unit adds fault data indicating a fault state of the plurality of second data units to a data portion different from a data portion in which the plurality of second data units are positioned within the first data unit.

5. The transmission apparatus according to claim 1, wherein the first data unit and the second data unit are optical data units conforming to OTN recommended by ITU-T.

6. The transmission apparatus according to claim 1, wherein the first data unit is an optical data unit conforming to OTN recommended by ITU-T, and the second data unit is a data unit other than the optical data unit conforming to OTN.

7. The transmission apparatus according to claim 1, further includes:
    an obtainment unit configured to obtain the first data unit; and
    an extraction unit configured to extract the fault data from the first data unit.

8. A reception apparatus comprising:
    an obtainment unit configured to obtain a first data unit which includes a second data unit and in which fault data indicating a first number of occurrences of faults in units of second data units, and a second number of occurrences of faults in units of divided units into which the second data unit is divided, is added to a data portion different from a data portion in which the second data unit is positioned; and
    an extraction unit configured to extract the fault data from the first data unit.

9. The reception apparatus according to claim 8, wherein
    the second data unit further includes a third data unit, and
    the fault data further indicates a fault state of the third data unit, and is added to at least one of a data portion different from a data portion in which the second data unit is positioned within the first data unit, and a data portion different from a data portion in which the third data unit is positioned within the second data unit.

10. The reception apparatus according to claim 8, wherein
    the second data unit is included in a payload part of the first data unit, and
    the fault data is added to an overhead part of the first data unit.

11. The reception apparatus according to claim 8, wherein
    the first data unit includes a plurality of second data units, and
    the fault data indicates a fault state of the plurality of second data units.

12. The reception apparatus according to claim 8, wherein the first data unit and the second data unit are optical data units conforming to OTN recommended by ITU-T.

13. The reception apparatus according to claim 8, wherein the first data unit is an optical data unit conforming to OTN recommended by ITU-T, and the second data unit is a data unit other than the optical data unit conforming to OTN.

14. The reception apparatus according to claim 8, further includes:
    a generation unit configured to generate the first data unit; and
    an addition unit configured to add the fault data to a data portion different from a data portion in which the second data unit is positioned within the first data unit.

15. A transmission method comprising:
    generating a first data unit including a second data unit; and
    adding fault data indicating a first number of occurrences of faults in units of second data units, and a second number of occurrences of faults in units of divided units into which the second data unit is divided, to a data portion different from a data portion in which the second data unit is positioned within the first data unit.

16. A reception method comprising:
    obtaining a first data unit which includes a second data unit, and in which fault data indicating a first number of occurrences of faults in units of second data units, and a second number of occurrences of faults in units of divided units into which the second data unit is divided, is added to a data portion different from a data portion in which the second data unit is positioned; and
    extracting the fault data from the first data unit.

* * * * *